US008959050B2

(12) United States Patent
Ng et al.

(10) Patent No.: US 8,959,050 B2
(45) Date of Patent: Feb. 17, 2015

(54) MECHANISM FOR SYNCHRONIZING OLAP SYSTEM STRUCTURE AND OLTP SYSTEM STRUCTURE

(75) Inventors: Rondy Ng, Redwood Shores, CA (US); Robert C. Zwiebach, San Mateo, CA (US); David Haimes, Belmont, CA (US); Djiao Mei Siauw, Redwood City, CA (US); Gregory David Roth, Ridgewood, NY (US); Arunesh Banerjee, Fremont, CA (US); Santosh Kumar Matam, Santa Clara, CA (US); Venkata Ramana Murthy Kosuri, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/464,899

(22) Filed: May 4, 2012

(65) Prior Publication Data
US 2013/0073521 A1 Mar. 21, 2013

Related U.S. Application Data

(60) Provisional application No. 61/536,903, filed on Sep. 20, 2011.

(51) Int. Cl.
  *G06F 17/00* (2006.01)
  *G06F 17/30* (2006.01)
(52) U.S. Cl.
  CPC ............................... *G06F 17/30557* (2013.01)
  USPC .......................................................... 707/610

(58) Field of Classification Search
  USPC .................................................. 707/610, 104
  See application file for complete search history.

(56) References Cited

U.S. PATENT DOCUMENTS

| 6,356,900 | B1 * | 3/2002 | Egilsson et al. ....................... 1/1 |
| 8,156,150 | B2 | 4/2012 | Ng et al. |
| 2002/0055901 | A1 | 5/2002 | Gianakouros et al. |
| 2003/0144868 | A1 * | 7/2003 | MacIntyre et al. ................. 705/1 |
| 2006/0010156 | A1 | 1/2006 | Netz et al. |
| 2006/0201775 | A1 | 9/2006 | Tedesco et al. |
| 2008/0307503 | A1 | 12/2008 | Waters |
| 2009/0198657 | A1 | 8/2009 | Hattori |
| 2009/0319553 | A1 | 12/2009 | Le Brazidec et al. |
| 2010/0198777 | A1 * | 8/2010 | Lo et al. ......................... 707/601 |
| 2011/0289092 | A1 * | 11/2011 | Kumar et al. ................. 707/741 |

OTHER PUBLICATIONS

Office Action for U.S. Appl. No. 12/484,596 (Oct. 27, 2011).
Notice of Allowance for U.S. Appl. No. 12/484,596 (Feb. 22, 2012).

* cited by examiner

*Primary Examiner* — Sherief Badawi
*Assistant Examiner* — Courtney Harmon
(74) *Attorney, Agent, or Firm* — Kilpatrick Townsend and Stockton LLP

(57) ABSTRACT

In an embodiment, for any structural change that is made to a relational database, a corresponding change is also made to the multidimensional database. In an embodiment, the system determines that a particular structure is not implemented on the multidimensional database system. Based on metadata that defines the structure that is supposed to exist in the multidimensional database, the appropriate structure is created.

12 Claims, 16 Drawing Sheets

MECHANISM FOR SYNCHRONIZING OLAP SYSTEM STRUCTURE AND OLTP SYSTEM STRUCTURE

CROSS-REFERENCES TO RELATED APPLICATIONS

The present application is a non-provisional of and claims the benefit and priority under 35 U.S.C. 119(e) of U.S. Provisional Application No. 61/536,903 filed Sep. 20, 2011, entitled MECHANISM TO CREATE CUBES FOR ANALYTIC BALANCES IN THE OLAP SYSTEM WHEN LEDGERS ARE CREATED IN THE OLTP SYSTEM. the entire contents of which are incorporated herein by reference for all purposes.

This application also incorporates by reference for all purposes the entire contents of the following related and commonly-assigned non-provisional applications:
(1) U.S. Non-Provisional application Ser. No. 13/464,897, titled MECHANISM FOR UPDATING OLAP SYSTEM STRUCTURE AND OLTP SYSTEM STRUCTURE, filed May 4, 2012.
(2) U.S. Non-Provisional application Ser. No. 12/484,596, filed Jun. 15, 2009, titled FUSION GENERAL LEDGER, now U.S. Pat. No. 8,156,150, issued Apr. 10, 2012.

FIELD OF THE INVENTION

The present invention relates generally to Online Analytical Processing (OLAP) and Online Transaction Processing (OLTP) systems, and in particular to systems that integrate OLTP systems with OLAP systems.

BACKGROUND

Today, companies are under increasing pressure to provide accurate and reliable information faster and more efficiently to both internal and external decision makers. Often, the information required is financial data. However, the systems used to log transactions have traditionally been separate from the tools used to analyze the data. One example of a system used to log transactions is an Online Transaction Processing (OLTP) system. An example of a system used to analyze data is an Online Analytical Processing (OLAP) system.

OLTP systems manage applications that are transaction oriented, and are typically implemented using relational databases. Companies generally account for financial information in a ledger (which also may be referred to as a relational database or flat-file database) or other spreadsheet. These ledgers offer easy entry and maintenance of the accounting information. However, studying the information in the ledger is cumbersome or not possible.

A ledger may be created in a relational database to store financial transactions called "journal entries." When a business transaction occurs, a journal entry is inserted into a table associated with the ledger. Journal entries may be inserted into a general ledger or sub-ledgers. In accounting, a "general ledger" (GL) is one of the main financial records of a business. The general ledger includes more or less all of the accounts which are reported on the business' financial statements, such as cash, accounts payable, and expense accounts. Each ledger in the general ledger typically keeps a balance, or the running total of money, in each account for which the business wishes to track. A sub-ledger may represent accounts payable or accounts receivable, or any other type of ledger, for example.

Each account for which journal entries are made is represented in a "chart of accounts." A "chart of accounts" is a collection of account names. Small businesses may wish to track a small number of accounts, but large businesses commonly wish to track hundreds or even thousands of accounts. These accounts may correspond with different departments, organizations, or operational units within the business, as well as different product lines. Accounts may also correspond to different funds in educational or charitable institutions.

Although OLTP systems are simple to implement and efficient for processing transactions, generating reports from an OLTP system can be inefficient and time consuming. For example, it may be possible to determine revenues for one subsidiary over a predetermined amount of time. However, it may be very difficult or impossible to determine revenues for 15 foreign subsidiaries from selling a particular product during different times. The reason is that the data in the ledger is not stored in a manner where complex queries are easily made. Reports in OLTP systems are typically not pre-aggregated with balance information, and must therefore be executed each time the information is needed. Traditionally, complex reports generated from relational database systems have been run during a scheduled time, or from backup databases for this reason.

OLAP systems are capable of generating complex reports in an extremely efficient manner. OLAP systems support analysis and management reporting applications, and are often implemented in a multidimensional database that stores data in "cubes." In contrast to relational database tables, which store data in two dimensions similar to a spreadsheet, OLAP cubes can store data in many dimensions, with each dimension representing a different view of the data. For example, a financial application may include dimensions for each fiscal quarter, a dimension for each year, and a dimension for each type of currency. Once data is stored in the OLAP system, all views are automatically populated, allowing all information defined by a particular view to be accessed instantaneously. However, these databases are much more difficult to populate with data and it is much more difficult to maintain the data already input.

Users of an OLTP system can perform complex reporting by periodically extracting data such as balances from various ledgers. For example, data may be extracted from the OLTP system every 6 hours, or daily. A user may then put the extracted data into a data warehouse that implements an OLAP system according to the user's specifications. However, this requires that the user build the data warehouse system as a custom solution. Applications can then be used to run reports against the data in the OLAP system. With such external data warehouses, all processes are custom, and do not produce real-time results, due to the time delay between each export operation. In addition, for maintenance-related to changes to the values or dimensions in the OLAP system, a user of such a system must create separate customer-specific processes to update the external data warehouse.

In view of the foregoing, it is desirable to maintain a OLTP system that is synchronized with an OLAP system. In addition, it is desirable to ensure that structural changes to an OLTP system are implemented simultaneously with corresponding structural changes to the OLAP system.

BRIEF SUMMARY

The embodiments presented herein provide systems, methods, and data structures combining a ledger and a multidimensional database. The ledger and multidimensional database are characterized with metadata dimensions that map the ledger to the multidimensional database. After mapping, data can be received into the ledger. A synchronization of the data copies the data automatically to the multidimensional database. Thus, there is no manual copying of data between the ledger and the database. Further, the latency between the ledger and database is minimal, ensuring accurate analysis even contemporaneous with the input of the data.

Furthermore, aspects of the present invention allow for a relational database and a multidimensional database to never be out of sync with one another. This is due, in part to the fact that the present invention has a single process which updates data in both the relational database and the multidimensional database. Thus, one cannot be updated without the other also being updated.

Embodiments include a unique reporting platform that is natively built on top of a multidimensional data model. The multidimensional data model is seamlessly embedded with the general ledger. At the moment users create a chart of accounts or subsequently modify a date-effective hierarchy, such as adding a new cost center, the corresponding multidimensional data model is created and updated at the same time. As transactions are posted, the balances are also updated simultaneously and pre-aggregated at every possible summarization level, making reports, online queries and multidimensional analysis extremely fast. By embedding online analytical processing (OLAP) into the online transactional processing (OLTP) system, large quantities of data may be stored in such a way that it can be accessed and analyzed quickly. Users may quickly analyze data from different perspectives from the same system where transactions are entered and generate financial and management reports. All reports and queries are based on the same balances to ensure consistency between the transaction processing and analytical processing portions of the system.

In an embodiment, solutions provide an integrated aggregated Business Intelligence (BI) data in a single system along with OLAP data. A single process performs transactional processing and also maintains the aggregated BI data. According to one embodiment, when a transaction is processed in the general ledger, it updates both multidimensional database cubes and general ledger relational tables in a single process. This provides BI information that is perfectly synchronized with the OLAP data. Embodiments provide instantaneous access to live BI data, and enable the general ledger to automatically update the general ledger aggregated BI data in real time. This removes the need for a costly data warehouse that is built and maintained by each customer and allows users to have access to live data in both the general ledger (for transactions) and the multidimensional database (for reporting).

A solution to maintain an integrated balances cube with a single process that maintains both the relational table in the OLAP system and the analytical balances in the OLTP system has not been performed before in Enterprise Resource Planning (ERP) applications, such as accounting applications.

In an embodiment, when a chart of accounts is created or changes are made to the chart of account values, a customer can run a separate process to update the applicable cubes. If the customer does not run or schedule the process, the process may automatically run and update the cube for new values if a transaction (journal entry) is posted to that new value. By maintaining an integrated balances cube with a single process, embodiments provide added efficiency, because users are not required to create a separate data warehouse solution with custom processes. Embodiments enable the general ledger balance cubes to be automatically updated with data from the general ledger using standard processes for new or changed chart of account values and hierarchies.

In an embodiment cubes are created for analytic balances in a OLAP system in response to determining that ledgers have been created in an OLTP system. The ledger setup user interface in an embodiment is fully integrated to create a balances cube, so that when the ledger is created, a balances cube will also be created. There is no need to create a customized data warehouse solution, which would require custom cube creation. The automatic cube creation process enables the general ledger to seamlessly initiate the general ledger balances cube, and begin general ledger processing, which is also fully integrated with the balances cubes. As a result, a user that posts a journal entry to the general ledger is able to run a report using the ledger balances cube and instantly retrieve updated results that take the latest journal entry into consideration.

In an embodiment, dimension members for chart of account segments and hierarchies for chart of account segments are updated. General Ledger balances are transferred between the multidimensional database and relational database portions of the system. In an embodiment, General Ledger balances will be updated to the multidimensional database by the General Ledger posting program. In an embodiment, Chart of Account dimension member changes will be performed automatically for the multidimensional database at the same time changes are made to the relational database portion of the system.

In an embodiment, users can manage which hierarchies, versions and start/end periods to aggregate. In addition, users may be able to publish hierarchy changes from a UI or a schedulable program at a time that best fits the needs for their organization. The ability to schedule hierarchy changes is important because such changes cause cube downtime such that posting journal entries cannot occur at the same time. In addition, because the multidimensional database since the multidimensional database may not handle hierarchy versions in embodiments, the number of hierarchies could potentially be increased, and therefore, each version may be represented as a separate hierarchy in the multidimensional database.

In an embodiment, user-interface triggers are used to determine when an update to the multidimensional database should be performed. In an embodiment, triggers may be used to initiate creation and maintenance of cubes, creation and update of dimension members, creation and update of hierarchies, transfer of General Ledger balances, and other updates to the multidimensional database. In an embodiment, a program is embedded which automatically performs the desired change in response to the appropriate trigger. For example, changes to a user interface may result in a change to dimension members and hierarchies in the multidimensional database. The embedded program may be run on demand or may be run on a schedule that fits the needs of the organization. In an embodiment, each program that updates the multidimensional database does so without using an intermediate layer such as a synchronization component, an Oracle Data Layer (ODI) or an Extraction, Transformation, and Loading (ETL) layer.

BRIEF DESCRIPTION OF THE DRAWINGS

The present disclosure is described in conjunction with the appended figures:

FIG. 11B represents an example user interface for displaying and editing metadata that is stored in a relational database structure.

FIG. 11C represents user interface displaying data after a new year has been added to a calendar.

Figure 1:
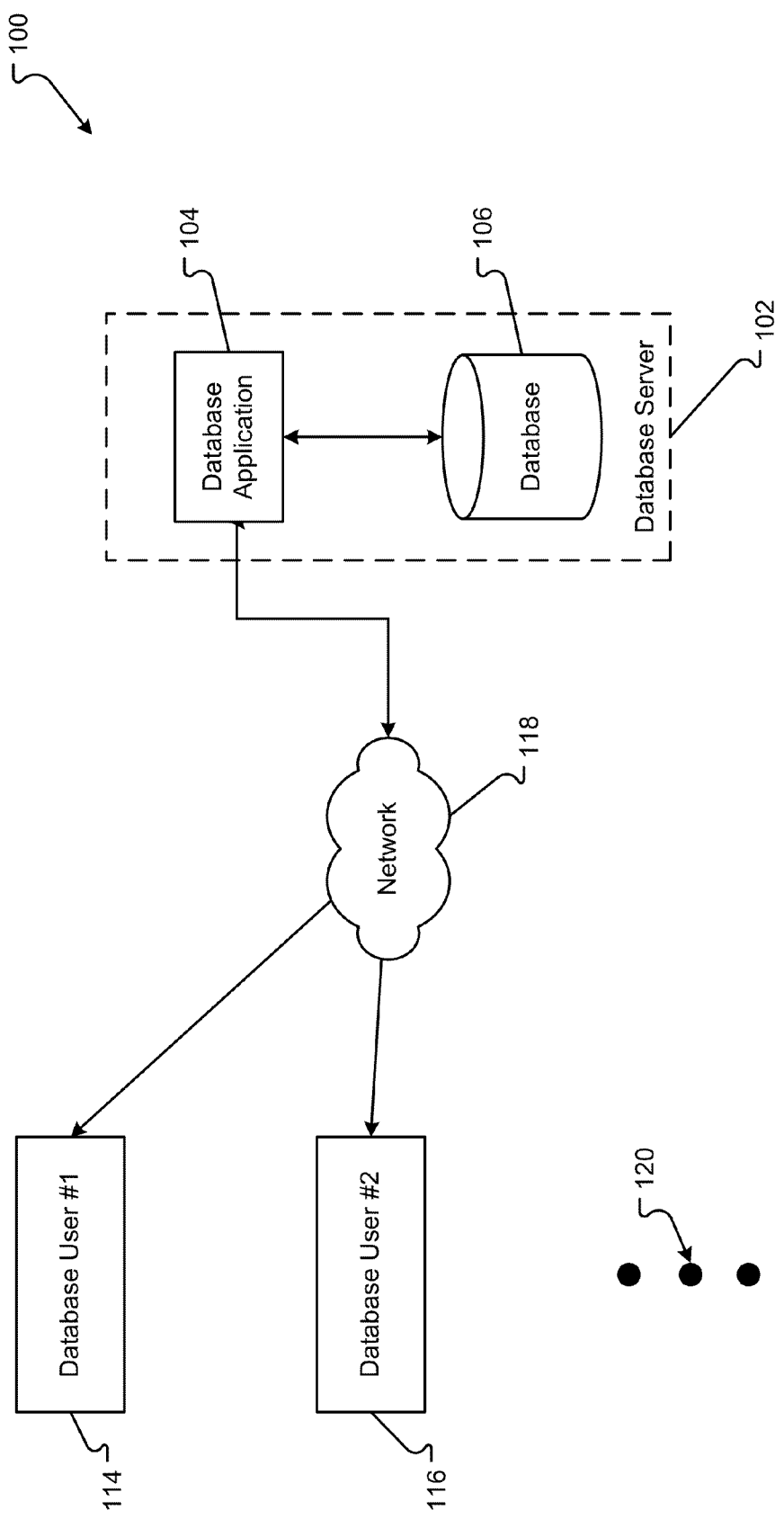
FIG. 1 is a block diagram of an embodiment of an accounting system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Example Embodiment

The embodiments presented herein can be employed by a company or organization for organizing financial data. For example, a consumer products manufacturer and seller, such as Dell Computers, can store financial information in the database. First, a financial manager or other employee would describe the data that is presented in the company's general ledger. The description may include the products associated with the revenue, the store that received the revenue, the date the revenue was received, etc. These descriptions are input into the general ledger to a cube of the multidimensional database.

As the financial employees enter financial data into the general ledger, the data is copied into the multidimensional database based on the definitional file. Thus, financial data for sales of laptops at a store in Denver during the month of March is entered into the general ledger. This data is transferred to the multidimensional database based on the product (laptops), the store location (Denver), and the date (March).

When another employee wants to investigate the financial information, the employee enters a query. For example, the employee may want to know the revenue from all computers sold in Denver during March. The query can be reviewed and determined to be best met by the multidimensional database. Thus, the query is sent to the multidimensional database. The information entered above may compose a portion of the result returned to the employee.

In an embodiment, a metadata repository is maintained for storing metadata associated with database structures. This metadata is called structural metadata. The structural metadata defines one or more structures for storing data in both: a) a relational database, and b) a multidimensional database. Metadata is generated for new structures that are added to the database, and acts as the source of truth, defining the structures that should be implemented on the relational database and the multidimensional database. In an embodiment, the metadata is based on structure information from a metadata library of available structures. After the metadata for a new structure is generated (or before or at the same time), the structures corresponding to the metadata are generated in the relational and multidimensional databases. In an embodiment, for any change that is made to the relational database, a corresponding change is also made to the multidimensional database.

In an embodiment, the system determines that a particular structure is not implemented on the multidimensional database system. For example, the financial data for the sales of laptops in the San Francisco store during the month of April may be provided to the system, which determines that the appropriate cube and dimension members have not been generated to support the insertion of that data into the multidimensional database. Based on metadata that defines the structure that is supposed to exist in the multidimensional database, the appropriate structure is created, and the financial data is stored. In an embodiment, the analysis and structure creation process is performed automatically, without user visibility.

The systems, data structures, user interfaces, and methods that embody this example are described hereinafter.

The Database System

An embodiment of a database system 100 is shown in FIG. 1. The one or more components comprising the database system 100 may be computer systems as described in conjunction with FIG. 8. Each component may be hardware and/or software operable to perform the functions described herein. The database system 100 can include at least a database server 102 in communication with one or more database users 114 and/or 116 through a network 118.

Database users 114 and/or 116 are computer systems that allow a user to enter, review, query, modify, or commit an action on the data stored in the database server 102. The database users 114 and/or 116 can include more or fewer database users than those shown in FIG. 1, as represented by the ellipses 120. The database users 114 and/or 116 may execute a software application that allows the user to interact with the database server 102. During the interaction with the user, the database users 114 and/or 116 can generate one or more user interfaces that allow the user to act on the financial data. A database user 114 or 116 can send messages to the database server 102. The messages can include an action to be performed on the data, financial data, and/or metadata describing the financial data. Likewise, the database user 114 or 116 may receive messages including financial data and/or metadata.

The database server 102 is also a computer system that receives, provides, organizes, and manages data in a database 106. A database server 102 can include the database 106 and a database application 104. The database 106 is the hardware and/or software required to store data both virtually and physically. A database 106 can be any memory or storage system as explained in conjunction with FIG. 8. The database application 104 is the software system operable to interact with the database users 114 and/or 116 and the database 106. The database application 104 can include one or more components as explained in conjunction with FIG. 2. A database application 104 can receive messages for the database server 102. The information in the messages, the action requested, the financial data, and/or the metadata, can instruct the database application 104 in executing an operation with the database 106. Further, the database application 104 can send to the database user 114 or 116 messages including financial data and/or metadata.

A network 118 may be one or more computer systems or other components that allow communications between the database users 114 and/or 116 and the database server 102. As explained herein, being in communication includes any arrangement of systems or component required to electrically couple one or more systems that allow for the exchange of electrical symbols. The network 118 can be a local area network (LAN), a wide area network (WAN), a wireless LAN, a wireless WAN, the Internet, or other network. The network 118 may be as explained in conjunction with FIGS. 8 and 9.

The Database Server

Figure 2:
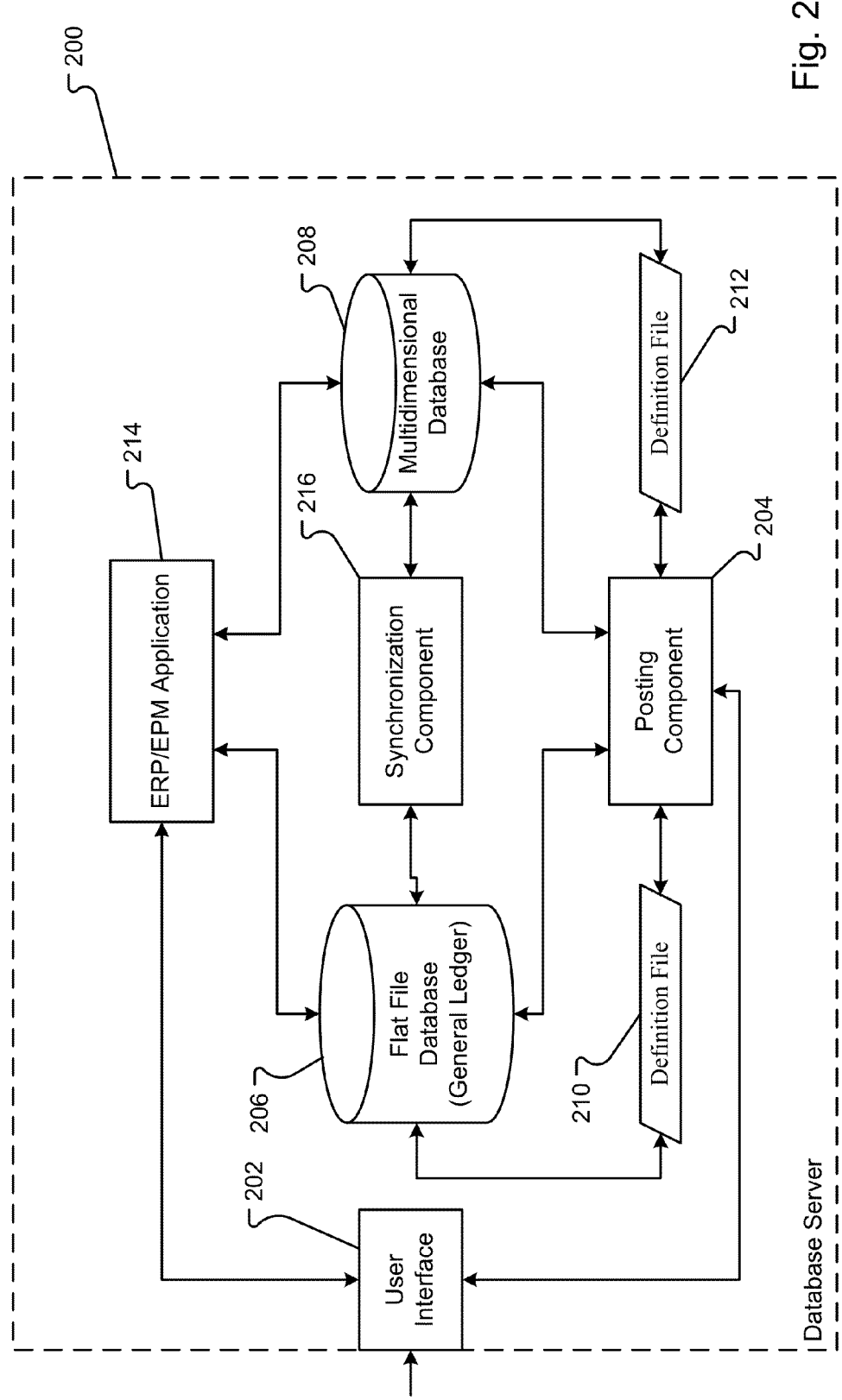
FIG. 2 is a block diagram of an embodiment of a database server.

An embodiment of a database server 200 is shown in FIG. 2. The components described in conjunction with database server 200 can be one or more software applications, modules, objects, etc. However, the function of the software components may be encompassed in hardware as a set of gates or other hardware components. The components perform the functions described herein.

A user interface 202 receives messages from and sends messages to the database users 114 and/or 116. The user interface 202 may also create one or more interfaces for display at the database users 114 and/or 116. For example, the user interface 202 may generate a user window for a general ledger as described in conjunction with FIG. 4. As part of storing data, the user interface 202 can receive financial data and accompanying metadata. The metadata can describe the financial data and inform how the financial data is to be stored. This received data and metadata can be sent to a posting component 204. The user interface 202 can also allow the database users 114 and/or 116 to interact with the financial data. Thus, the user interface 202 can receive requests to retrieve, read, modify, or commit another action on the data. These requests are sent to the ERP/EPM Application 214.

Figure 3:
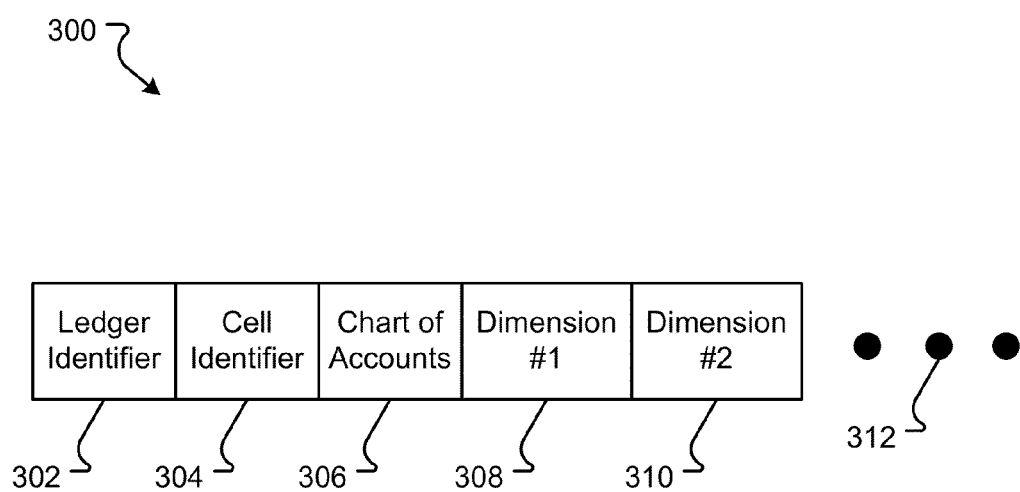
FIG. 3 is a block diagram of an embodiment of a data structure for defining a mapping between a ledger and a database.

The posting component 204 manages the storing of financial data into the general ledger 206 and/or the multidimensional database 208. The posting component 204 also manages structural changes to be made to the general ledger 206 and/or the multidimensional database 208. As used herein, the term general ledger may be used interchangeably with the terms flat file database or relational database, as the general ledger may be stored in these types of database systems. Likewise, the functions, actions, and capabilities described with respect to a flat file database also apply to a relational database. The posting component 204 can receive the financial data and read the metadata included therewith. From the metadata description, the posting component 204 determines into which cell or cube to store the data. For example, the posting component 204 may retrieve a definition file 210 or 212 for the flat file database 206 or the multidimensional database 208, respectively. The metadata received with the financial data is compared to the definitional file 210 or 212. Upon finding a match, the posting component 204 identifies this cell or cube as receiving the financial data and stores the data into the identified cell or cube. An embodiment of the definitional file 210 or 212 may be as described in conjunction with FIG. 3.

The flat file database 206 can be a relational database having a two dimensional structure. Data can be stored in a cell of the flat file database 206 defined by a row and a column. The flat file database 206 may be the general ledger for an account. In contrast, the multidimensional database 208 can be an Online Analytical Processing (OLAP) database arranged in several dimensions. The dimensions define cubes of data. The multidimensional database 208 allows complex analytical and ad-hoc queries for the data not easily provided by the flat file database 206. For example, a relational (or flat file) database is typically best suited for recording large volumes of information in which a company needs to run business operations; however, a multidimensional database is best suited for the types of complex analytical and ad-hoc queries for which managers need in order to be able to make decisions. Accordingly, aspects of the present invention allow for the union (or integration) of these two disparate systems with no manual work needed to keep them synchronized and also provides zero latency between the two systems.

In a further embodiment. each cell of the flat file database 206 can be mapped to a cell of a cube in the multidimensional database 208. Thus, data stored into the flat file database 206 may be simultaneously stored in the corresponding mapped cube in the multidimensional database 208 or the related data may be synchronized later.

Typically, a general ledger is an enterprise resource planning (ERP) application, whereas analytical application and milti-dimensional databases traditionally have enterprise performance management (EPM) functionality. Accordingly, in accordance with aspects of the present invention, the ERP/EPM application 214 is an application configured to provide both ERP and EPM functions un a unified and integrated application. The ERP/EPM application 214 operates to provide or modify data in response to users' requests in either the flat file database 206 and/or the multidimensional database 208. To determine what modification is necessary, the ERP/EPM application 214 may determine the type of request received from the user. Then, depending on the determination of the type of request, the ERP/EPM application 214 can affect data in the flat file database 206 or the multidimensional database 208.

A synchronization component 216 may provide a function for ensuring data in the multidimensional database 208 and the flat file database 206 is the same. For example, if new data is posted by the posting component 204 in only the flat file database 206, the synchronization component 216 can copy the data from the flat file database 206 into the related cell in the multidimensional database 208. To effect the copy of data, the synchronization component 216 may read the mapping of the cells in the definition file 210 or 212. The mapping identifies where changes data need be transferred to in the other database. A change in the flat file database 206 or the multidimensional database 208 can be signaled by the setting of a dirty bit or other similar identifier. The synchronization component 216 may synchronize data between the flat file database 206 and the multidimensional database 208 upon command or automatically in response to a change or periodically. For example, the synchronization component 216 may copy data between the multidimensional database 208 and the flat file database 206 every ten minutes, once a day, or once a week. The period of the synchronization will depend on the latency required by the user. In other words, how often is the data in one of the databases used and how soon is the newest data needed?

Definitional File or Metadata

In an embodiment, metadata such as definitional file 300 and other information is stored in a metadata repository, which may be implemented on database 206 or any other system capable of storing metadata. An embodiment of a definitional file 300, similar to or the same as definition files 210 and/or 212, is shown in FIG. 2. The definitional file 300 includes a mapping between the multidimensional database 208 and the flat file database 206. There can be a definitional file 300 that maps each of several general ledgers 206 to the multidimensional database 208. The definitional file 300 includes fields that cause a computer system to execute one or more actions; the fields include one or more of, but are not limited to, a ledger identifier 302, a cell identifier 304, a chart of accounts field 306, dimension #1 field 308, and/or dimension #2 field 310. A mapping can include more of fewer fields, which can include more dimensions, as represented by the ellipses 312.

In an embodiment, the metadata repository configured to store structure metadata. Structure metadata defines one or more structures for storing data in both: a) a relational database, and b) a multidimensional database. For example, definition files 210 and 212 may be stored in a metadata repository, and may include mappings that describe the way a particular structure is to be implemented on each system.

A ledger identifier 302 identifies the flat file in the flat file database 206. The flat file database 206 can include two or more flat files that represent a general ledger for a particular account. A ledger identifier 302 can be a globally unique identifier (GUID), an alphanumeric identifier, or some other identifier that identifies the ledger to the database user 114 and/or 116 or the database server 102. Similar to the ledger identifier 302, the cell identifier 304 identifies the cell in the ledger to the database user 114 and/or 116 or the database server 102. The cell identifier 304 can also be a GUID, an alphanumeric identifier, or some other identifier.

A chart of accounts field 306 can include a hierarchy for the general ledger or cell identified by the ledger identifier 302 and/or the cell identifier 304. The value or data placed in a cell in a first general ledger may be derived from another general ledger. For example, a first general ledger can have ten cells, each cell containing the total sales for a sales office. The total sales for a sales office can be based on another general ledger for that sales office. Thus, a chart of accounts can define from which other ledgers the present ledger obtains data and to which other ledgers the present ledger provides data. The chart of accounts field 306 can have data on a cell by cell basis, thus, providing a hierarchy for each cell. The cell identifiers 304 and ledger identifiers 302 can be recorded in the chart of accounts field 306 to record parent ledgers and cells and child ledgers and cells.

The mapping can also include one or more dimensions 308 and/or 310. Dimensions define the cubes in the multidimensional database 208. A dimension can be any category or characteristic of the data. For example, dimensions can include one or more of, but are not limited to, a ledger dimension, an accounting calendar dimension, a currency dimension, a chart of accounts dimension, a conversion rate, dimension, a currency type dimension, an amount type dimension, a third party dimension, a supporting reference dimension, and/or a legal entity dimension. Some of the dimensions may be included in other fields, for example, the ledger dimension may be incorporated in the ledger identifier 302 and the chart of accounts dimension may be incorporated in the chart of accounts field 306.

The account calendar dimension can include a time dimension, e.g., a date, for the financial data. The account calendar dimension can also include average balances for a given time period. A currency dimension can include a currency code for the financial data, e.g., USD, EURO, etc. A conversion rate type dimension can include the conversion rate between currencies for a given date, e.g., 1.5 USD per 1 EURO on Jan. 15, 2009. The currency type dimension can set a primary currency for the entries, e.g. USD, and all other currencies may be converted to this primary currency. An amount type dimension can include the type of financial data, e.g., period-to-date, quarter-to-date, year-to-date, project to-date, end-of-day, etc. type data. The third party dimension can describe if the financial data is from another organization. A supporting reference dimension can define any reference that explains the financial data, for example, a current project or task with which the financial data is associated. A legal entity dimension can describe the entity that generated the financial data, for example, a subsidiary, a branch office, etc. There may be other dimensions used, and the dimensions will depend on the user and the organization of the user's financial data.

The metadata repository includes structure definition template metadata in an embodiment. Structure definition template metadata describes pre-formed or "canned" structure types that may be implemented on both the general ledger 206 and the multidimensional database 208 in an embodiment. For example, a template for generating the structures required in the general ledger 206 the multidimensional database 208 to add a new year to a financial application may be stored in the metadata repository. When a request is made to add a new year, structure metadata is generated based on the "new year" structure definition metadata, changing placeholder information in the template to reflect the year requested by the user in the user interface. For example, the structure definition metadata may use a placeholder or variable for the year, but this will be replaced with a specific year upon the creation of structure metadata based on the "new year" structure definition metadata.

As discussed above, the posting component 204 also manages structural changes to be made to the general ledger 206 and/or the multidimensional database 208. The posting component 204 includes metadata generation logic that is configured to automatically generate structure metadata when a user makes a request to change the structure of flat file database 206 or multidimensional database 208. In an embodiment, this structural metadata describes the fields, tables, cubes and other elements needed to create the necessary structures in each database system. Structural metadata may also include mapping information that maps structures in the flat file database 206 to corresponding structures in multidimensional database 208. In an embodiment, the posting component 204 includes structure generation logic configured to generate or change structures in flat file database 206 and/or multidimensional database 208 based on the structural metadata.

In an embodiment, the posting component 204 also includes structure analysis logic that analyzes the general ledger 206 and/or the multidimensional and compares implemented structures with the structures defined in structure metadata. For example, a request to store an expense associated with the date Apr. 12, 2012 may trigger the structure analysis logic, which will verify that the structure required for performing the operation is implemented on both databases. If the structure is implemented properly, then the expense may be posted to both databases. However, if structure analysis logic determines that the structure does not exist on the multidimensional database, for example, structure generation logic may consult the structure metadata to determine how to generate the appropriate structure. Structure generation logic will then generate the appropriate structures according to the structural metadata, and posting will resume. Since all of this occurs as a result of a single posting operation, the user remains unaware of the apparent discrepancy between the two database systems.

In an embodiment, structure generation logic converts metadata information stored in a relational database into a hierarchical structure in order to facilitate the integration of that information into a multidimensional database. For example, posting component 204 may determine that a structure defined in the metadata is required in a multidimensional database. However, in order to create a structure that the multidimensional database can use, a hierarchy is generated based on parent and child references in the metadata for the relational database structure. Any reference may be used to indicate a parent/child relationship between two elements in a relational database. In an example shown in FIGS. 11C and 11D, element 1130, representing an accounting period named Jul-13 may be considered a child of the Quarter 4, which is in turn a child of the year 2012 based on the relationships of the element to the quarter and year that are defined by the inclusion of Quarter 4 and the year 2012 in the same row in the relational database. As shown in FIG. 11D, element 1140 represents the accounting period Jul-13 in a multidimensional database structure. In an embodiment, any relational database structure or structure defined for a relational database in metadata may be converted into a hierarchical structure if it defines parent/child relationships. These structures can then be represented in a multidimensional database, allowing data that is stored in a relational database to also be stored in a corresponding structure in a multidimensional database.

Figure 4:
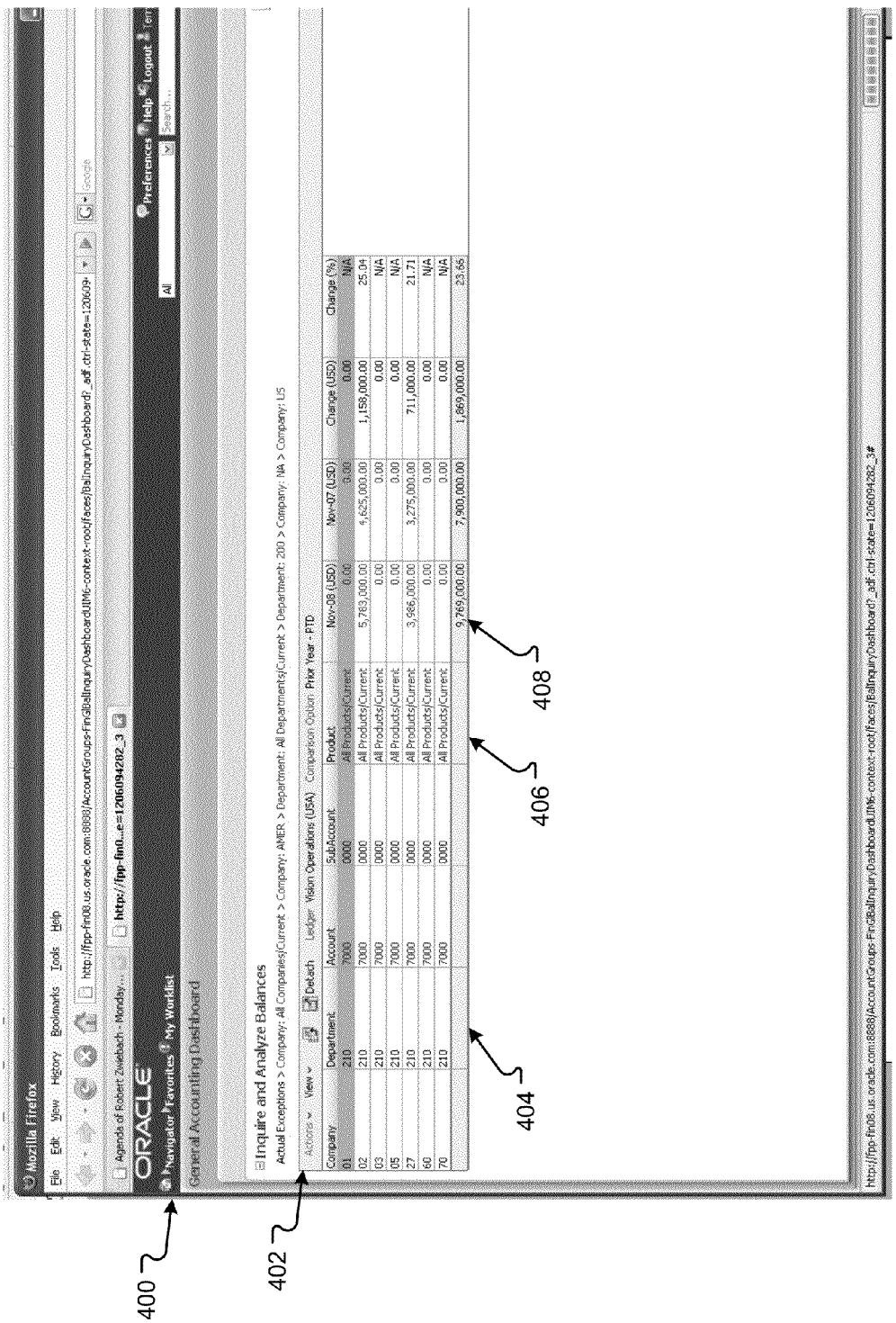
FIG. 4 is an embodiment of a user interface showing dimensions used in mapping a ledger to a database.

An embodiment of a user interface 400 providing a general ledger is shown in FIG. 4. The general ledger 402 can be mapped to the multidimensional database 208. For example, the department column 404 can map to a department dimension, as described in conjunction with FIG. 3. The product column 406 can map to a product dimension. Thus, each item of data, for example, in column 408, can have one or more dimensions that define where the data is stored in the multidimensional database 208.

Creating Multidimensional Database Cubes

Although the following examples are described with respect to accounting systems, other types of programs may use the functionality described herein, and use of the claimed features may provide benefits to any type of program or data storage system that uses multiple database systems.

In an embodiment, a separate multidimensional database cube is created for each combination of chart of accounts and calendar for standard balances, and as applicable, a separate cube for each combination of chart of accounts and calendar where a ledger exists with average balances enabled. Cube creation occurs when the accounting setup is submitted in an embodiment. This triggers the initiation of the structure generation logic, which then generates the appropriate cubes using cube creation logic. In an embodiment, when a cube is created, seed data is also created and additional post-cube-creation operations may be initiated when desired.

In an embodiment, cube creation logic creates a different multidimensional database cube for each combination of Fusion chart of accounts and accounting calendar that have been attached to a ledger and the accounting setup has been completed. Cube creation is seamless to the user. A cube is first created when an accounting setup is completed for the first time with that combination chart of accounts and calendar. The initiation of an account setup operation by the user may occur within a user interface. In an embodiment, once cube creation logic and all post cube creation programs finish, then the accounting setup is marked as complete in memory.

In an embodiment, the cube already exists for a combination of chart of accounts and calendar for which an account setup has been initiated.

Creating and Updating Dimension Members and Hierarchies

As updates are made to the structure of the relational database storing the general ledger, corresponding changes are made to the dimension members and hierarchies in the multidimensional database. For example, Chart of Accounts segment dimension members need to be updated regularly in the multidimensional database. In an embodiment, this is performed in real time through an FND business event. In addition, if posting should fail due to a missing dimension member, the chart of accounts update will be launched, and then posting will automatically be re-submitted again. Chart of Accounts segment changes that are included in the re-submission into the multidimensional database include adding a new segment value and making changes to a segment value.

Accounting calendar dimension member updates occur to the multidimensional database in an embodiment. All accounting periods defined will be considered (past, present and future). Only period names and the way they roll up to quarters and years are transferred to the multidimensional database in an embodiment. For example, start/end dates, calendar name, calendar description etc. do not need to be considered in an embodiment. In an embodiment, accounting calendar changes include defining a new calendar, adding an accounting period, and changing an accounting period.

In addition, a ledger dimension may be created at least when any of the following occur: Accounting setup is completed (to an existing cube, i.e. combination of chart of accounts and calendar); Reporting Currency is added after accounting setup is completed; and Secondary ledger is added after accounting setup is completed (to an existing cube). In an embodiment, ledger sets are also included in the multidimensional database. Ledger sets may be flattened in an embodiment so that ledgers will only appear once even though they are shared across multiple ledger sets within a ledger set. Other dimension members may also be updated in the multidimensional database when a corresponding change is made to the general ledger.

Immediately after changes in a hierarchy are identified, any chart of accounts segment hierarchies defined and maintained in the relational database should be available for financial reporting in the multidimensional database. In the multidimensional database, hierarchies are maintained at each individual value (parent or child). All ranges defined in the relational database may be converted to the individual value (parent or child) for the multidimensional database.

Accounting calendar dimension members and hierarchies may also be updated to the multidimensional database. For example, when a new calendar is defined, an accounting period is added, or an accounting period is changed in any way, the accounting calendar in the multidimensional database is updated to reflect the change. In an embodiment, accounting periods are each associated with a time dimension. Other dimension members that may be updated in the multidimensional database include currency dimension members.

In embodiment, structural metadata may be used to define the structures that are created in the multidimensional database and the relational database. In addition, a mapping between the structures defined for the multidimensional database and the relational database may be stored as structural metadata in the metadata repository.

Triggers for Cube Creation and Updating

In an embodiment, a user interface for managing the structure of database server 200 is generated and provided to users. Cube creation and updating may be performed in response to receiving input from a user interface. In addition, a concurrent program on demand for completely re-building the cube may be provided in an embodiment.

In an embodiment, a cube is created when an accounting setup is complete for ledgers that use a chart of accounts that do not have cubes defined in the multidimensional database. For the initial cube creation, this trigger can occur after initial ledger setup in an embodiment.

In an embodiment, Chart of Accounts segment dimension members may be updated in the multidimensional database in response to adding a new segment value, making changes to a segment value, or making changes to values defined in the hierarchy that are not segment values. Each time posting is run, a separate concurrent program to identify new/change dimension members will be generated and run in parallel to posting.

Accounting calendar dimension member updates may be implemented on the multidimensional database 208 in an embodiment. All accounting periods defined may be considered for updating (past, present and future). Period names and the way they roll up to quarters and years can be transferred to the multidimensional database. In an embodiment, the accounting calendar dimension changes occur in response to a new calendar being defined. In another embodiment, the addition of an accounting period triggers an update to accounting calendar dimension members in the multidimensional database. Although less common, the change of accounting periods may also trigger updates to the calendar dimensions in multidimensional database 208. Accounting periods may be changed, for example, during a conversion from a fiscal year accounting system to a calendar-based accounting system.

For accounting calendars that have not already been transferred to multidimensional database 208, calendar periods are transferred as dimension members in response to the completion of an accounting setup for ledgers that use that calendar. Multidimensional database 208 is also updated when the accounting calendar is submitted (not saved) and validation is passed from the accounting calendar UI both (a) for existing calendars, transfer new calendar periods as new dimension members as they are added; and (b) for existing calendars, transfer calendar period changes as dimension member changes when they occur.

The above updates can be achieved through a concurrent program generated from the applicable UI or a business event. The updates are real time. In addition, this option includes the ability to submit calendar dimension and calendar hierarchy updates on demand through a concurrent program in an embodiment.

In an embodiment, triggers may be incorporated into a non-financial implementation. For example, statistical analysis tools may collect transactional data that is stored in both an OLTP system (such as a relational database) and an OLAP system (such as a multidimensional database).

Processes for Mapping and Organizing Data

Figure 5:
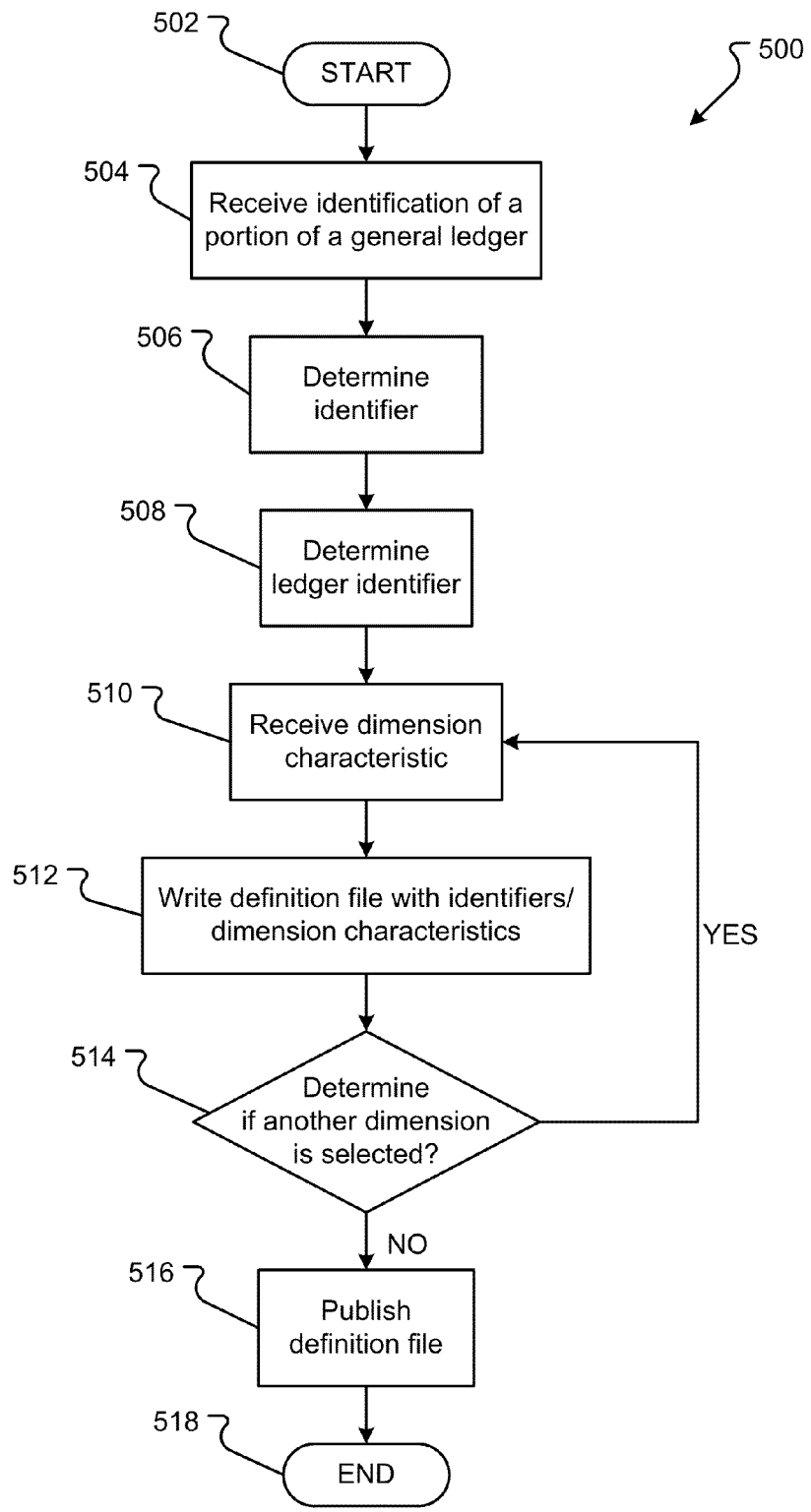
FIG. 5 is a flow diagram of an embodiment of a process for defining a mapping between a ledger and a database.

An embodiment of a method 500 for generating a mapping between a general ledger and a multidimensional database executed at a database server 102 is shown in FIG. 5. In embodiments, the method 500 generally begins with a START operation 502 and terminates with an END operation 518. The steps shown in the method 500 may be executed in a computer system as a set of computer-executable instructions. While a logical order is shown in FIG. 5, the steps shown or described can, in some circumstances, be executed in a different order than presented herein. Further, the steps shown in FIG. 5 may only be a subset of steps or may be substituted for other steps not shown in FIG. 5. The method 500 of FIG. 5 will be explained with reference to the drawings in FIGS. 1-4.

The database server 102 provides a user interface 400 to a database user 114. The user can identify a portion of the general ledger 206, such as a cell, column, table, or row. To identify the portion of the general ledger 206, the user may manipulate a user interface device to highlight or select the portion of the general ledger 206. The database server 102 receives the identification of the portion of the general ledger 206 in step 504. From the selection, the database server 102 determines an identifier, such as cell identifier 304, associated with the identified portion of the general ledger 206 in step 506. Each portion of the ledger, when created, has an identifier. When selected, the identifier can be determined by the location of the selection. The database server 102 may also determine one or more other identifiers for one or more other portions of the general ledger 206, such as the ledger identifier 302, in step 508.

The user may then identify a cube or portion of the multidimensional database 208. As with the general ledger 206, the user may select a portion of the multidimensional database 208 with a user interface device in a user interface. The portions of the multidimensional database 208 are created with dimensions. The selection of the portion of the multidimensional database 208 can identify the dimensional characteristics of the portion of the multidimensional database 208. The database server 102 receives the identified dimensional characteristics in step 510. A mapping may then be created.

The database server 102 writes a definitional file 210 including the identifiers for the general ledger 206 and the dimensional characteristics in step 512. An embodiment of a definitional file 300 was explained in conjunction with FIG. 3. As described, the definitional file 300 can include a cell identifier 304 and/or a ledger identifier 302. Further, the definitional file 300 may also include one or more dimensional characteristics 308 and/or 310. At least one identifier and dimensional characteristic are written to the definitional file 300 to map the general ledger 206 to the multidimensional database 208.

A user may select one or more other dimensional characteristics to the one or more identifiers. As such, each identifier may be defined by two or more dimensional characteristics. To accomplish the mapping to two or more dimensional characteristics, the database server 102 determines if another dimension is selected by the database user 114 in step 514. If and when another dimension is selected, the method 500 proceeds YES to receive the next dimension in step 510. When there is no other dimension selected, the method 500 proceeds NO to step 516, The database server 516 can then publish the definition file 210 by allowing other components to read or use the definition file 210 in step 516.

Processes for Writing Data

Figure 6:
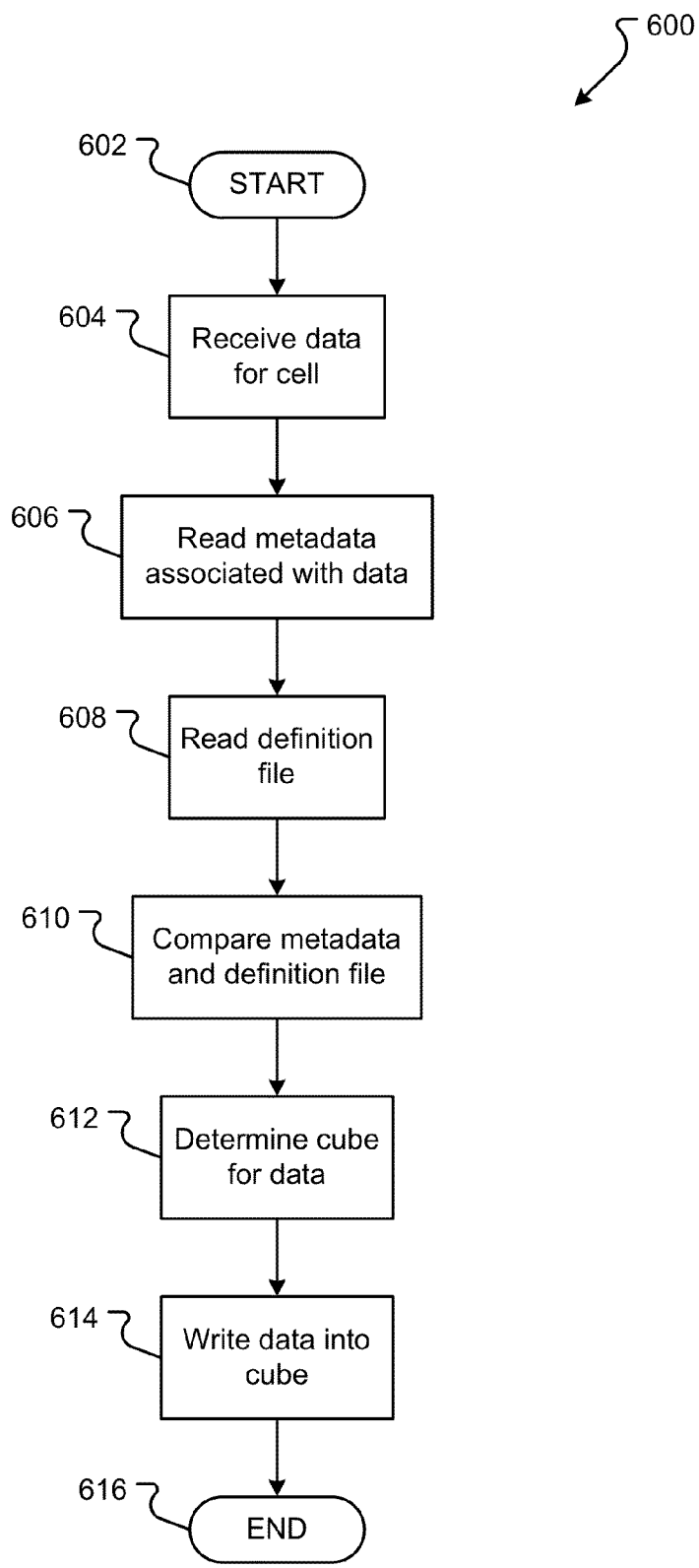
FIG. 6 is a flow diagram of an embodiment of a process for writing data to a ledger and a database.

An embodiment of a method 600 for writing data to a general ledger and a multidimensional database executed at a database server 102 is shown in FIG. 6. In embodiments, the method 600 generally begins with a START operation 602 and terminates with an END operation 616. The steps shown in the method 600 may be executed in a computer system as a set of computer-executable instructions. While a logical order is shown in FIG. 6, the steps shown or described can, in some circumstances, be executed in a different order than presented herein. Further, the steps shown in FIG. 6 may only be a subset of steps or may be substituted for other steps not shown in FIG. 6. The method 600 of FIG. 6 will be explained with reference to the drawings in FIGS. 1-4.

A user can input data into a database user 114 for a general ledger 206 stored at a database server 102. For example, a user enters data into a cell of the general ledger 400. Upon committing the data, the database server 102 can receive the data for the cell in step 604. The data may also include metadata similar to the data described in conjunction with FIG. 3. For example, the metadata can include the ledger identifier 302, the cell identifier 304, and one or more dimensional characteristics 308 and/or 310. The database server 102 can read the metadata associated with the received data in step 606.

A definitional file 210 or 212 can define structure for either the general ledger 206 or the multidimensional database 208. The database server 102 can retrieve and read the definitional file 210 or 212 in step 608. For example, the definitional file 210, also including information as described in conjunction with FIG. 3, includes ledger identifiers 302 and cell identifiers 304 that are read. The database server 102 compares one or more items in the metadata with one or more items in the definitional file 210 or 212 in step 610. One or more comparisons can be made, for example, comparing the ledger identifiers 302 and/or the cell identifiers 304. Based on the comparison, the database server can determine the cell in the general ledger 206 or the cube in the multidimensional database to which to write the data in step 612. In response to the determination, the database server 102 writes the data into the cell or cube in step 614.

An example of the process would have data entered into the general ledger 400. The data would be received by the database server 102 with at least a cell identifier 304. The cell identifier 304 is located in the definitional file 212, which determines the cube for the data in the multidimensional database 208. Then, the database server 102 can then write the data to both the general ledger 206 and the multidimensional database 208 without further information from the user.

Processes for Modifying Data

Figure 7:
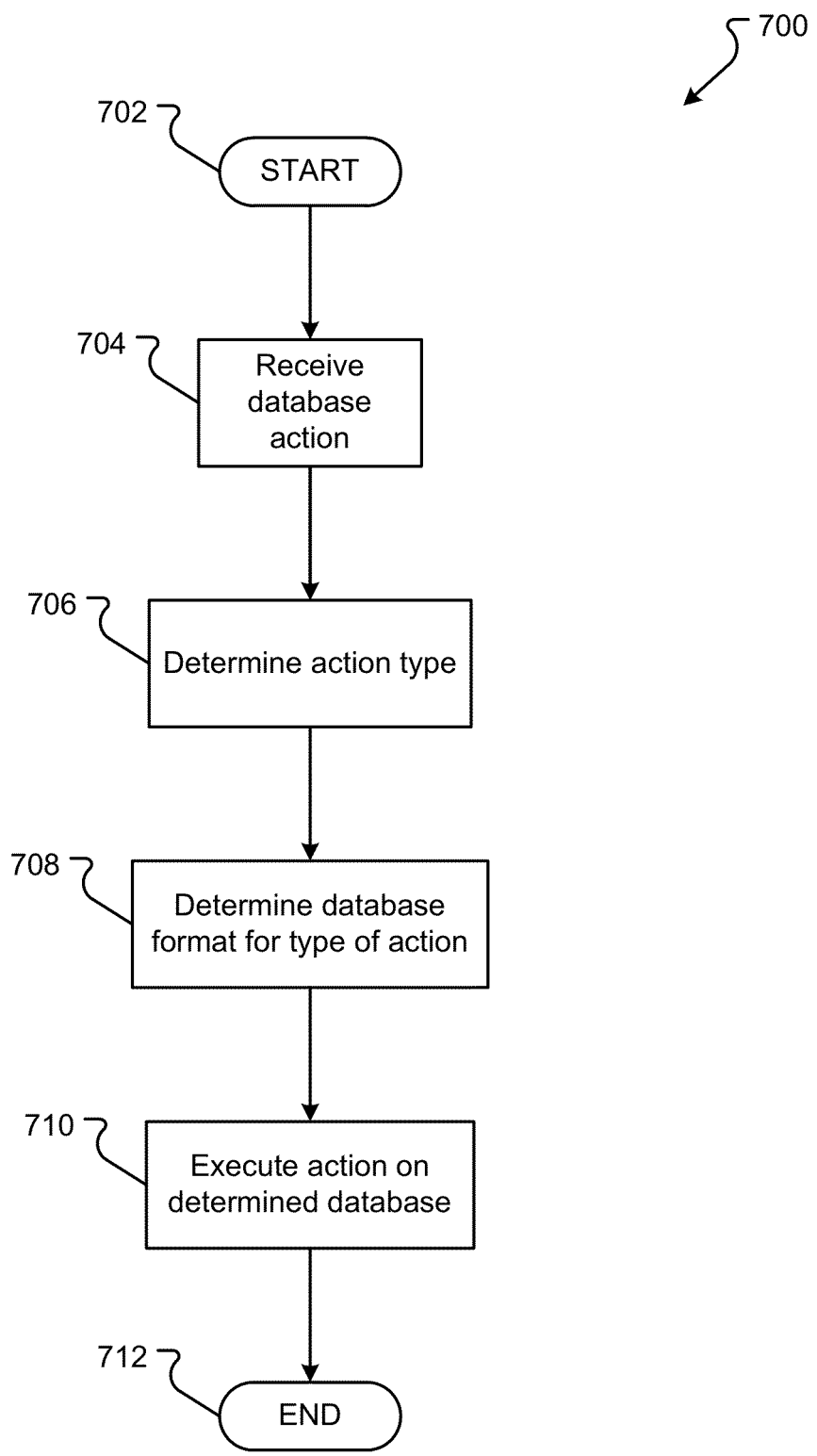
FIG. 7 is a flow diagram of an embodiment of a process for executing an action on accounting data.

An embodiment of a method 700 for modifying data stored in both a general ledger and a multidimensional database executed at a database server 102 is shown in FIG. 7. In embodiments, the method 700 generally begins with a START operation 702 and terminates with an END operation 712. The steps shown in the method 700 may be executed in a computer system as a set of computer-executable instructions. While a logical order is shown in FIG. 7, the steps shown or described can, in some circumstances, be executed in a different order than presented herein. Further, the steps shown in FIG. 7 may only be a subset of steps or may be substituted for other steps not shown in FIG. 7. The method 700 of FIG. 7 will be explained with reference to the drawings in FIGS. 1-4.

A user can conduct operations or actions on data stored in the general ledger 206 or the multidimensional database 208. The operations can include creating new data, changing existing data, reformatting data, query, etc. Operations or actions can be conducted with a user interface device in the database user 114 on a user interface 400. The operations may employ an ERP/EPM application 214 to conduct the action. Further, the action can be performed on the data in either the general ledger 206 or the multidimensional database 208 or may be submitted generally without being directed at either a general ledger 206 or the multidimensional database 208. Upon committing the action, the ERP/EPM application 214 of the database user 102 may receive the database action in step 704.

Based on the user actions as received by the database user 114, the ERP/EPM application 214 can determine the type of action performed in step 706.

Based on the type of database action, the ERP/EPM application 214 can determine upon which of the general ledger 206 or the multidimensional database 208 to execute the action in step 708. The definitional file 210 and/or 212 may determine which actions the general ledger 206 or the multidimensional database 208 shall execute. Each action may be better suited on one type of format of database. For example, the multidimensional database 208 may be better suited to querying data while the general ledger 206 may be better suited for currency conversions. In response to the determination of which of the general ledger 206 or the multidimensional database 208 upon which to execute the action, the ERP/EPM application 214 executes the action in either the general ledger 206 or the multidimensional database 208 in step 710.

Processes for Synchronizing Data

Figure 8:
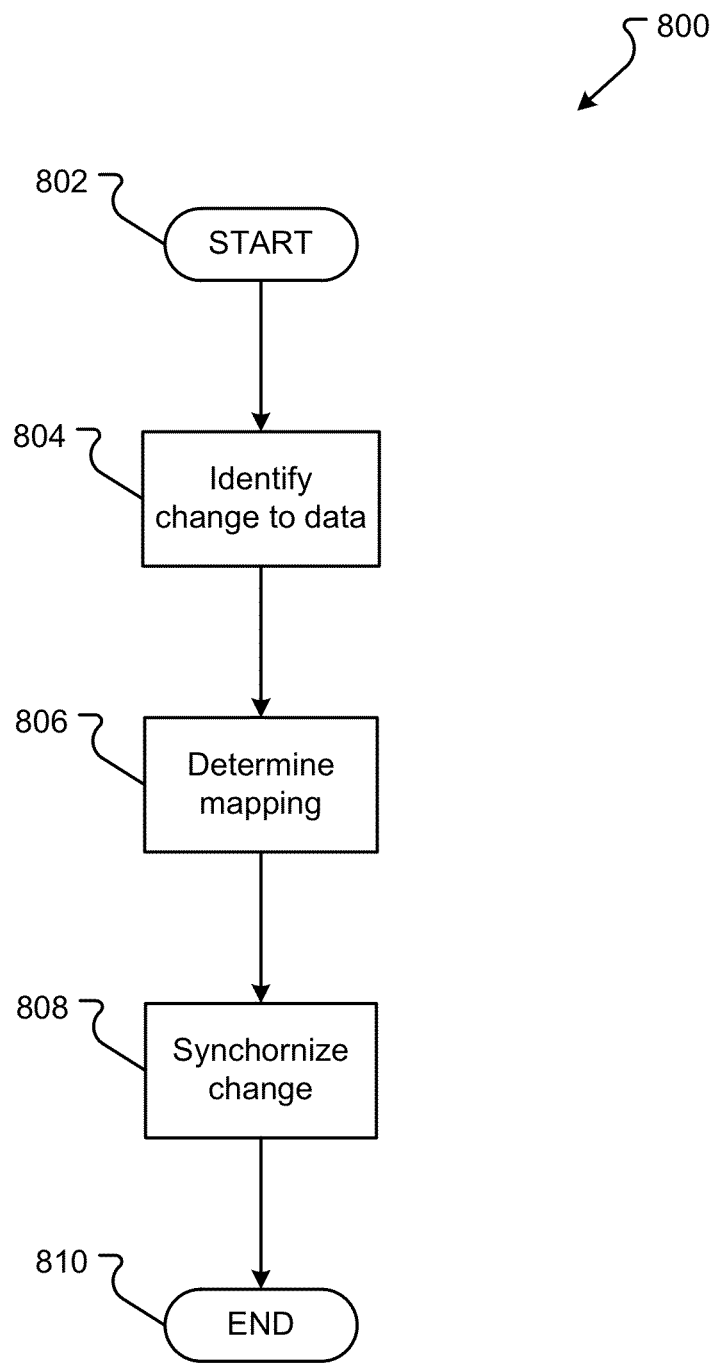
FIG. 8 is a flow diagram of an embodiment of a process for synchronizing changes between a ledger and a database.

An embodiment of a method 800 for synchronizing data between a general ledger and a multidimensional database executed at a database server 102 is shown in FIG. 8. In embodiments, the method 800 generally begins with a START operation 802 and terminates with an END operation 810. The steps shown in the method 800 may be executed in a computer system as a set of computer-executable instructions. While a logical order is shown in FIG. 8, the steps shown or described can, in some circumstances, be executed in a different order than presented herein. Further, the steps shown in FIG. 8 may only be a subset of steps or may be substituted for other steps not shown in FIG. 8. The method 800 of FIG. 8 will be explained with reference to the drawings in FIGS. 1-4.

The database server 102 identifies a change to data in either the general ledger 206 or the multidimensional database 208 in step 804. The change may be from an action performed by the ERP/EPM application 214 or from a posting of new data by the posting component 204. A change can be recognized by the setting of a "change" or "dirty" bit or flag. The change flag signifies the data in the general ledger 206 or the multidimensional database 208 is different.

The synchronization component 216 can identify the change for the database server 102 and then determine the mapping for the data in step 806. The synchronization component 216 may retrieve a definition file 210 or 212 and read an identifier for the data in either the general ledger 206 or the multidimensional database 208. After finding the identifier, the synchronization component 216 can determine the mapped section in the other database. For example, if the synchronization component 216 identifies the cell identifier 304 in the definitional file 210 for data in the general ledger 206, then, the synchronization component 216 can determine the mapping of the data in the multidimensional database 208 based on the one or more dimension characteristics 308 and/or 310.

After determining the mapping, the synchronization component 216 can synchronize the change between the general ledger 206 or the multidimensional database 208 in step 808. Thus, if the change is in the general ledger 206, the synchronization component 216 copies the change to the multidimensional database 208 or vice versa. It is possible to complete the synchronization as changes are made or complete several changes in a batch mode. For example, every day at midnight the synchronization component 216 can synchronize the changes between the general ledger 206 and the multidimensional database 208. The method used, that is, near real-time changes or batch synchronization, will depend on the needs of the user, such as latency tolerance, processing requirements, number of changes, etc.

Processes for Updating Structure

Figure 9:
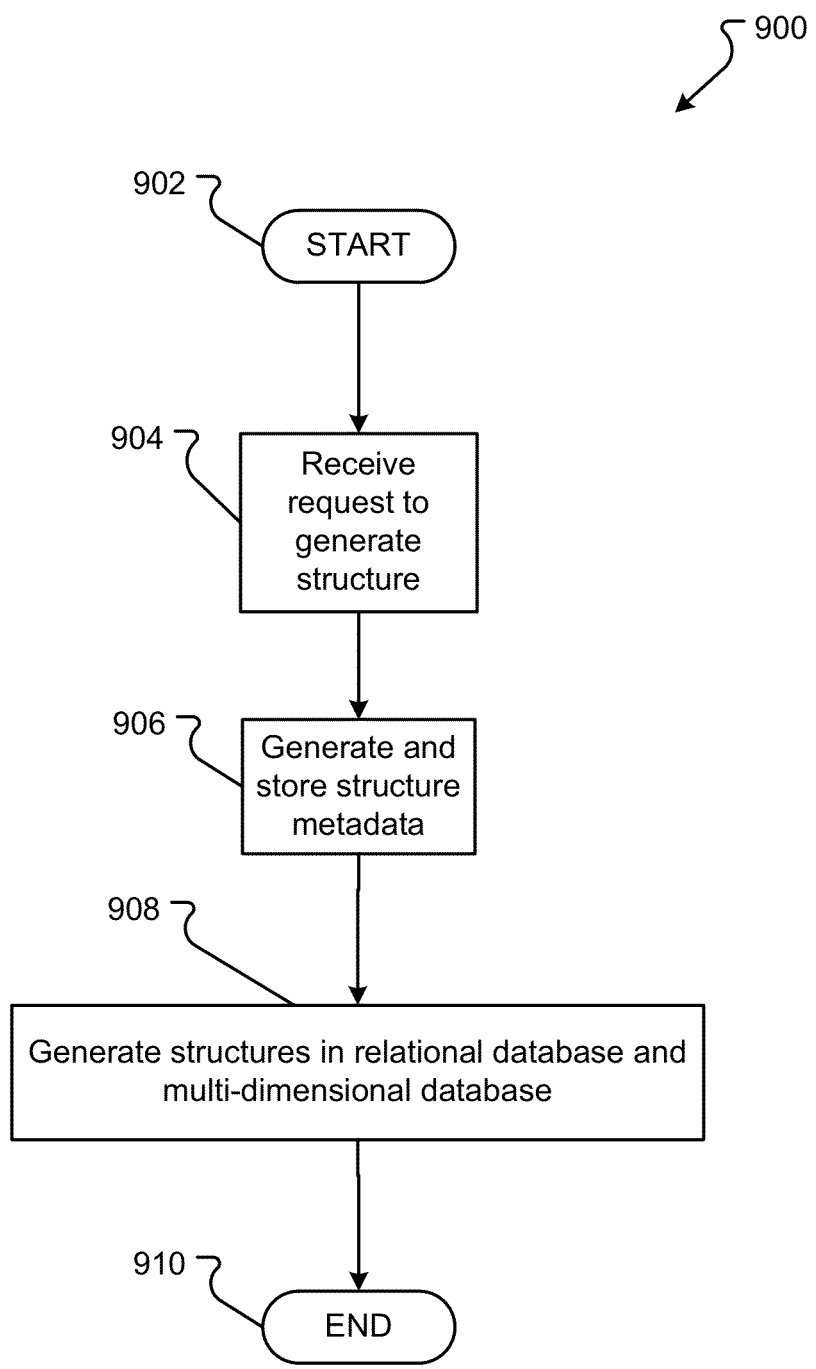
FIG. 9 is a flow diagram of an embodiment of a process for updating database structures in an embodiment.

An embodiment of a method 900 for synchronizing data between a general ledger and a multidimensional database executed at a database server 102 is shown in FIG. 9. In embodiments, the method 800 generally begins with a START operation 802 and terminates with an END operation 910. The steps shown in the method 900 may be executed in a computer system as a set of computer-executable instructions. While a logical order is shown in FIG. 9, the steps shown or described can, in some circumstances, be executed in a different order than presented herein. Further, the steps shown in FIG. 9 may only be a subset of steps or may be substituted for other steps not shown in FIG. 9. The method 900 of FIG. 9 will be explained with reference to the drawings in FIGS. 1-4.

The database server receives a request to generate a structure in either the general ledger 206 or the multidimensional database 208 in step 904. The request may be associated with an action performed by the ERP/EPM application 214 or from a request via a user interface. For example, a user may request that a new "year" be added to a financial calendar in a financial application so that transactions may be entered into the general ledger 206 and the multidimensional database 208.

In an embodiment, metadata generation logic generates metadata associated with the requested structure in response to receiving the request in step 906. This metadata may include structure definition information that defines the way the structure is to be implemented in both the general ledger 206 and the multidimensional database 208. For example, the structure may be implemented as one or more tables in the general ledger 206 and as cubes with particular dimension members in the multidimensional database 208. At step 908, structure generation logic generates the appropriate structures in the general ledger 206 and the multidimensional database 208.

In an embodiment, metadata generation logic is configured to change the metadata associated with the structure in response to receiving a second request to change a particular structure that is defined by the structure metadata. For example, a user may request, through a user interface, that a month in a financial calendar be changed from "Sept" to "September." This request will trigger a change in the metadata defining the appropriate table in the general ledger 206 and the dimension member in the multidimensional database 208 in an embodiment. In addition, structure generation logic may implement these changes on the appropriate table in the general ledger 206 and the dimension member in the multidimensional database 208.

Processes for Synchronizing Structure

Figure 10:
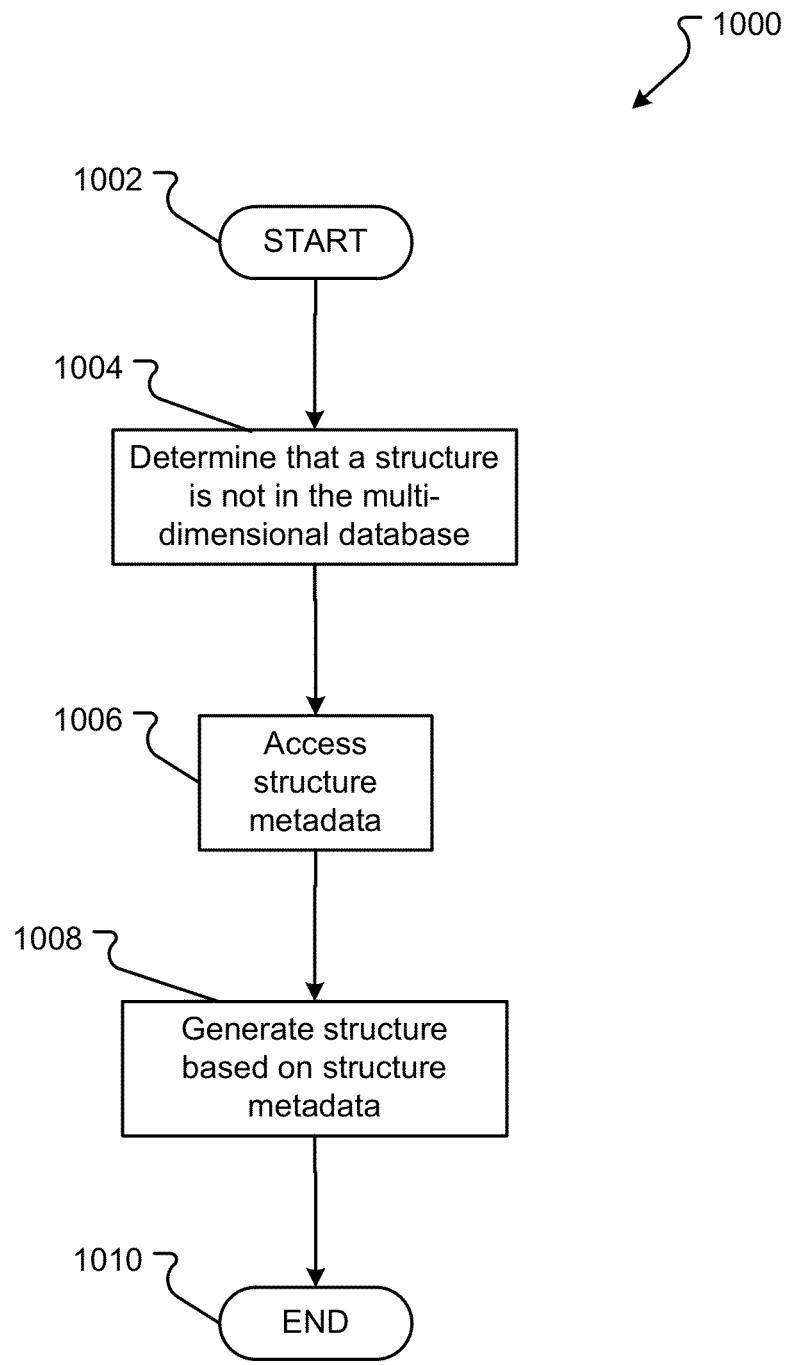
FIG. 10 is a flow diagram of an embodiment of a process for synchronizing database structures in an embodiment.

An embodiment of a method 1000 for synchronizing data between a general ledger and a multidimensional database executed at a database server 102 is shown in FIG. 10. In embodiments, the method 1000 generally begins with a START operation 1002 and terminates with an END operation 1010. The steps shown in the method 1000 may be executed in a computer system as a set of computer-executable instructions. While a logical order is shown in FIG. 10, the steps shown or described can, in some circumstances, be executed in a different order than presented herein. Further, the steps shown in FIG. 10 may only be a subset of steps or may be substituted for other steps not shown in FIG. 10. The method 1000 of FIG. 10 will be explained with reference to the drawings in FIGS. 1-4.

The database server 102 detects that a structure is not implemented in the multidimensional database 208 in step 904. For example, a request may be made to the database server 102 may receive a request to post a transaction. The database server 102 attempts to post the transaction to the general ledger 206 and the multidimensional database 208. However, structure analysis logic may determine, before posting to the multidimensional database 208, that the structure required for posting the transaction to the multidimensional database 208 is not implemented on the multidimensional database 208. In other words, a table may be implemented in the relational database 206, but the corresponding cube structure and dimension members may not be implemented on the multidimensional database 208.

Structure generation logic accesses structure metadata at step 1006 in an embodiment. In an embodiment, structure metadata describes all structures that should be implemented on both the general ledger 206 and the multidimensional database 208. At step 1008, structure generation logic generates the missing structure based on the structure metadata. For example, structure generation logic generates the cube structure and dimension members that are required for posting the transaction to the multidimensional database.

In an embodiment, the determination that a particular structure is not available in the multidimensional database is made in response to a request to store data in the nonexistent structure. For example, a request may be made to store a transaction data in a structure associated with the date May 20, 2012. Although the structure may be implemented in the relational database 206, it is not implemented in the multidimensional database. Once the structure is created, data is then stored in the structure. In an embodiment, a determination is made that the structure is implemented in the multidimensional database, in which case the data is stored without the need to create a structure.

In an embodiment, a structural integrity operation may be performed periodically to determine whether any structures are missing in the relational database 206 or the multidimensional database 208. For example, a user or administrator may want to ensure that all structures that are supposed to be implemented on the multidimensional database 208 have been implemented. A structural integrity operation may be scheduled to run at a particular time, or at time intervals, comparing the structures that are implemented on the multidimensional database with the structures defined in the structure metadata. Structure generation logic may be invoked to generate missing structures, if found by structure analysis logic.

Example User Interface

Figure 11A:
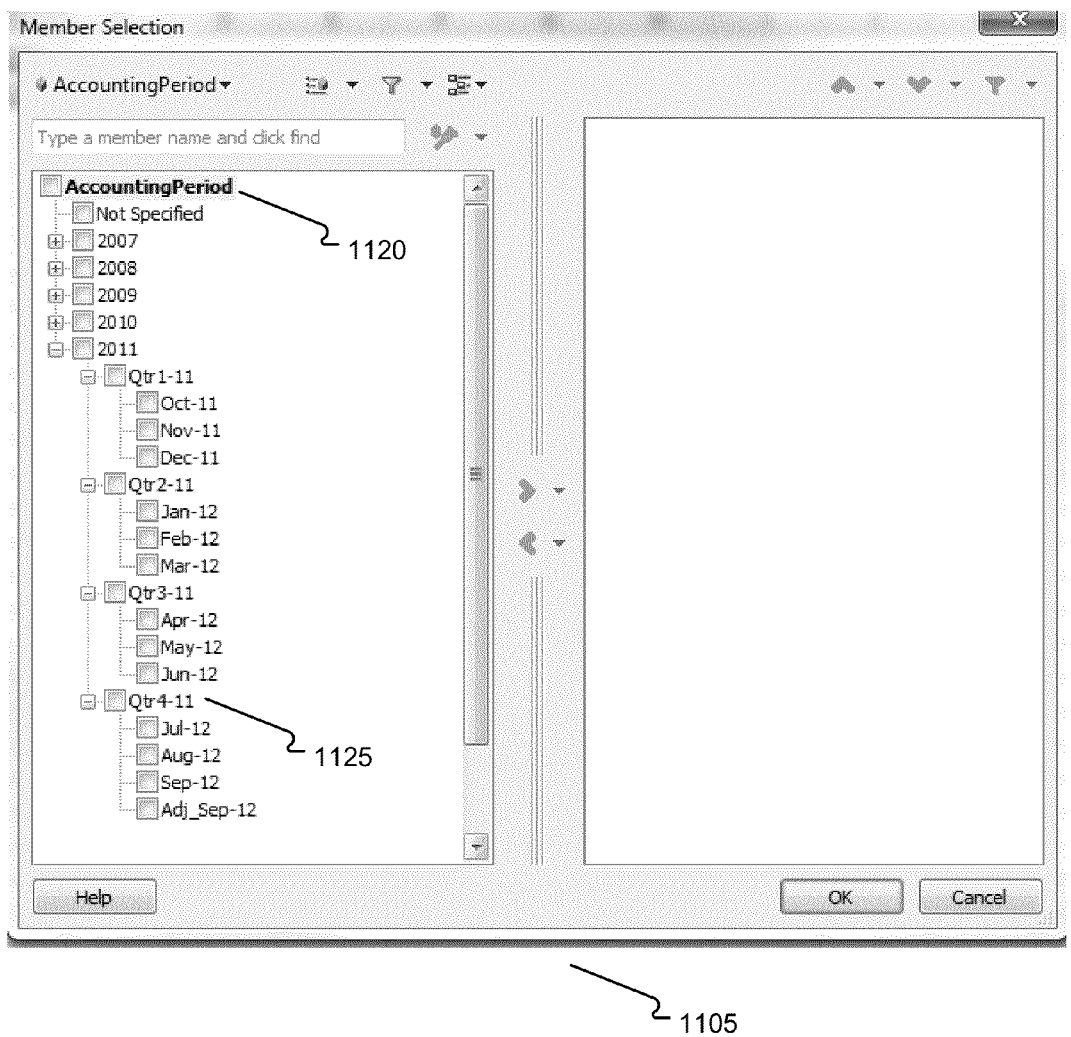
FIG. 11A represents an example user interface for displaying and editing a hierarchical structure represented in a multidimensional database structure.
Figure 11B:
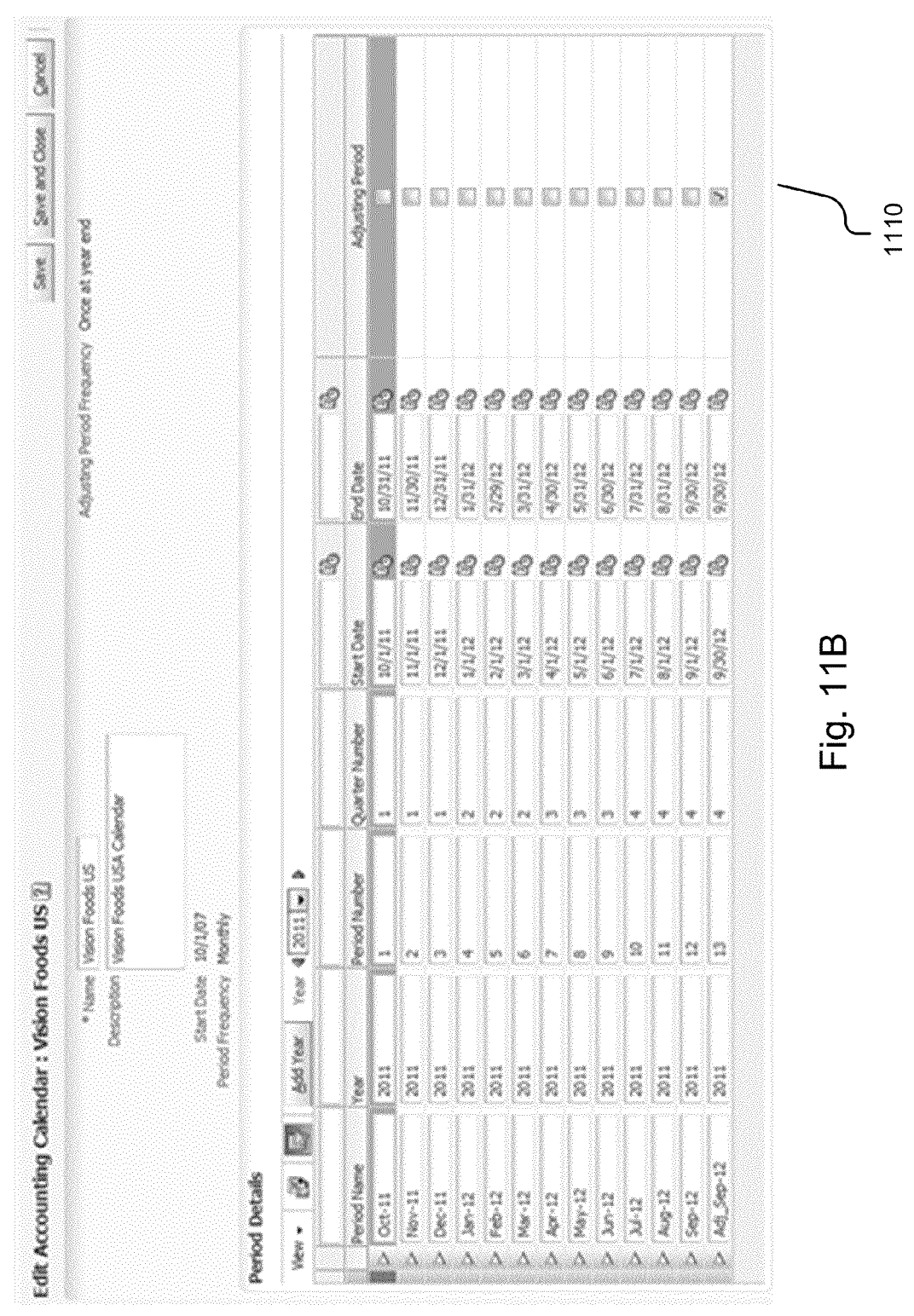
Figure 11C:
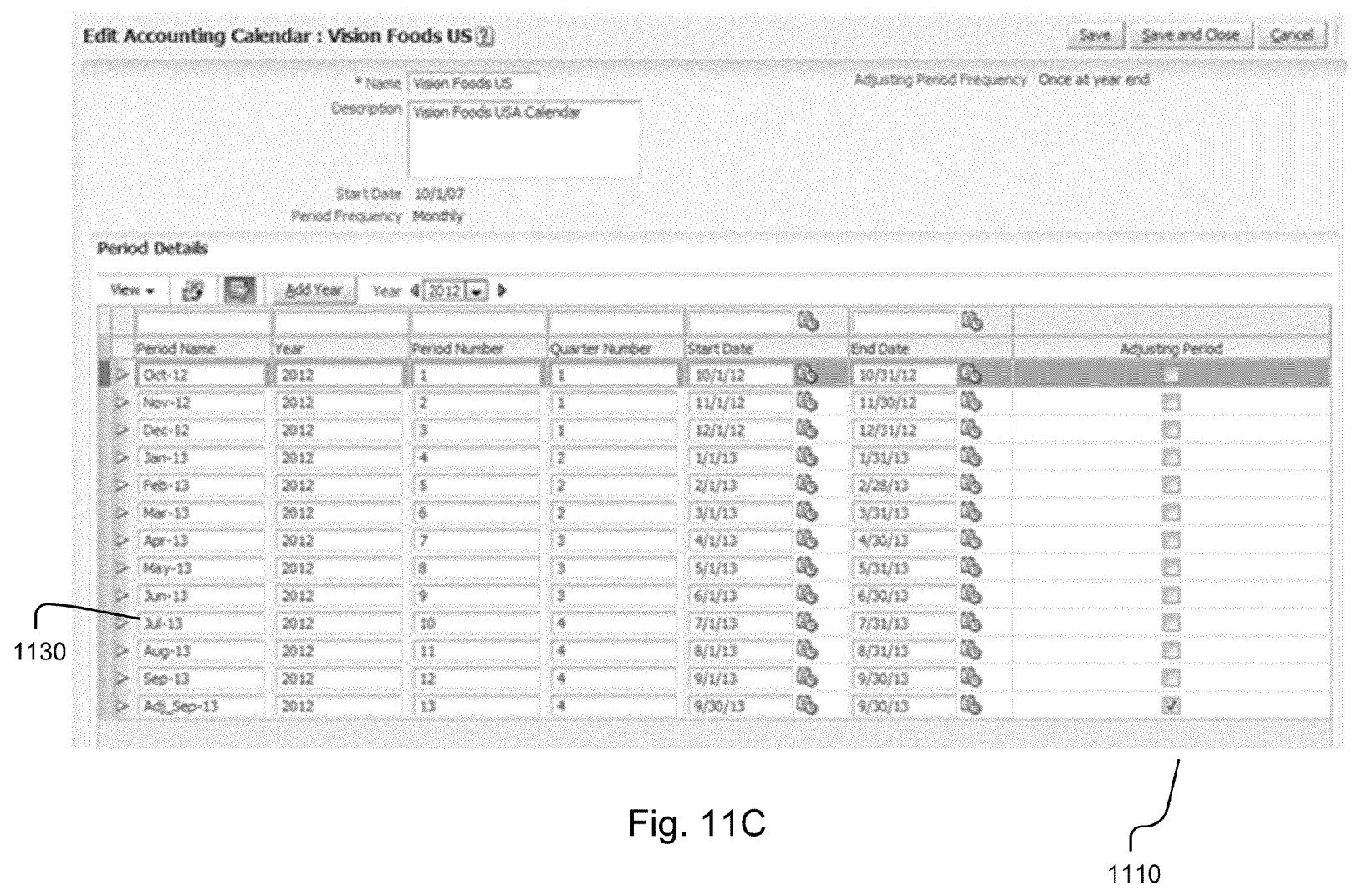
Figure 11D:
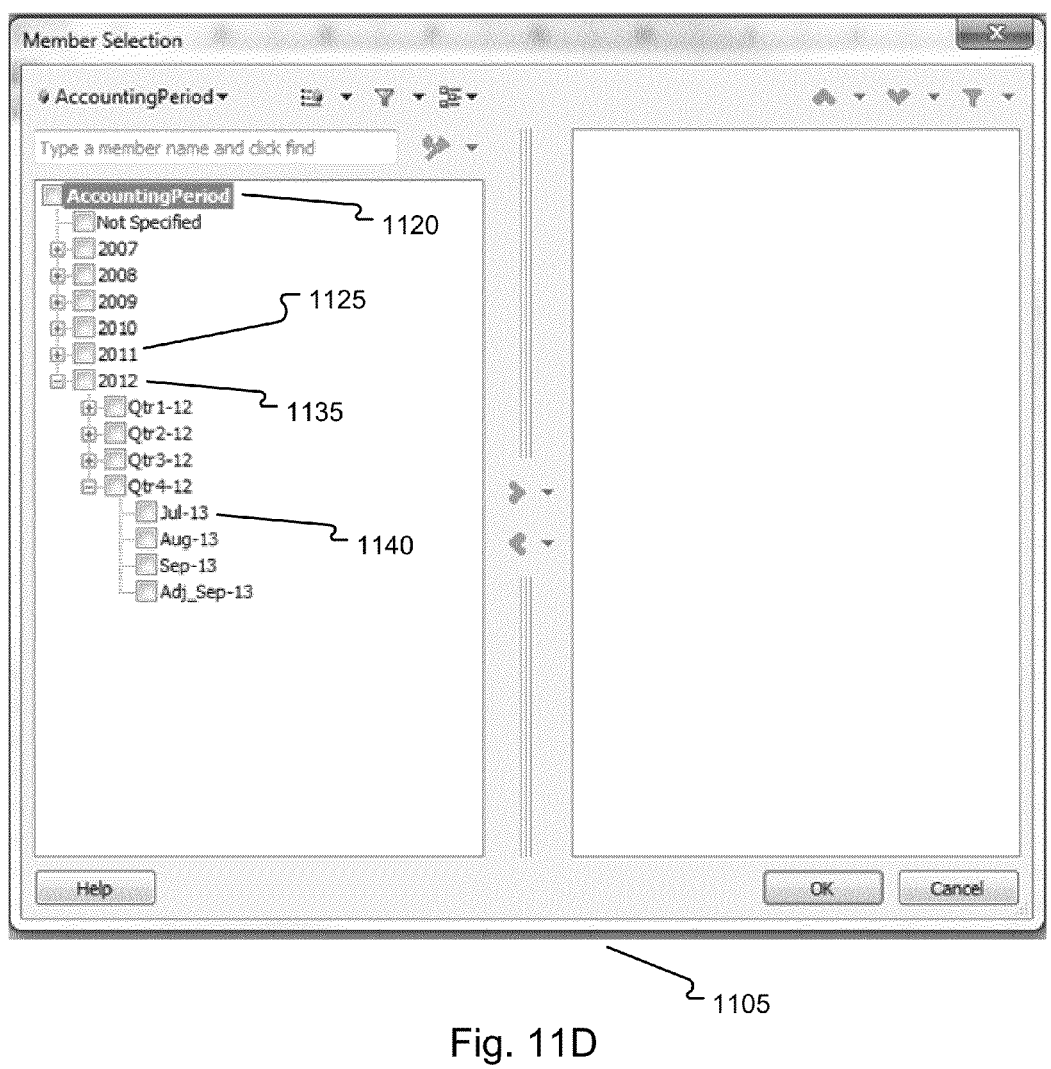
FIG. 11D represents user interface after changes associated with adding a year to a calendar have been performed on a multidimensional database structure.

FIG. 11A represents an example user interface 1105 for displaying and editing a hierarchical structure represented in a multidimensional database structure. User interface 1105 represents a structure for a calendar having a time period ending in the year 2011. Such calendars are useful, for example, in accounting applications. Element 1120 represents a multidimensional database dimension called "AccountingPeriod" that is implemented in a multidimensional database. The hierarchical structure shown in user interface 1105 also includes element 1125, which represents a dimension member called "Qtr4-11."

FIG. 11B represents an example user interface 1110 for displaying and editing metadata that is stored in a relational database structure. User interface 1110 represents a metadata associated with a calendar having a time period ending in the year 2011. In an embodiment, the structures for the relational database depicted in user interface 1110 correspond to structures depicted in user interface 1105, although the representation of these structures is different. For example, a relational database may store information in tables, relying on parent/child references to represent hierarchical structures, while multidimensional databases are capable of representing hierarchical data as shown in user interface 1105.

FIG. 11C represents user interface 1110 displaying data after the year 2012 has been added to the calendar. Element 1130 represents a period name that has been added to the calendar for the year 2012. Element 1130 is named Jul-13, represents period 10 for the year 2012, and starts on Jul. 1, 2013. Element 1130 directly corresponds to element 1140 in FIG. 11D, which is a dimension member in the multidimensional database. FIG. 11D represents user interface 1105 after changes associated with adding the year 2012 have been performed on the multidimensional database structure. For example, element 1135 has been added to represent the year 2012.

Computer Systems

Figure 12:
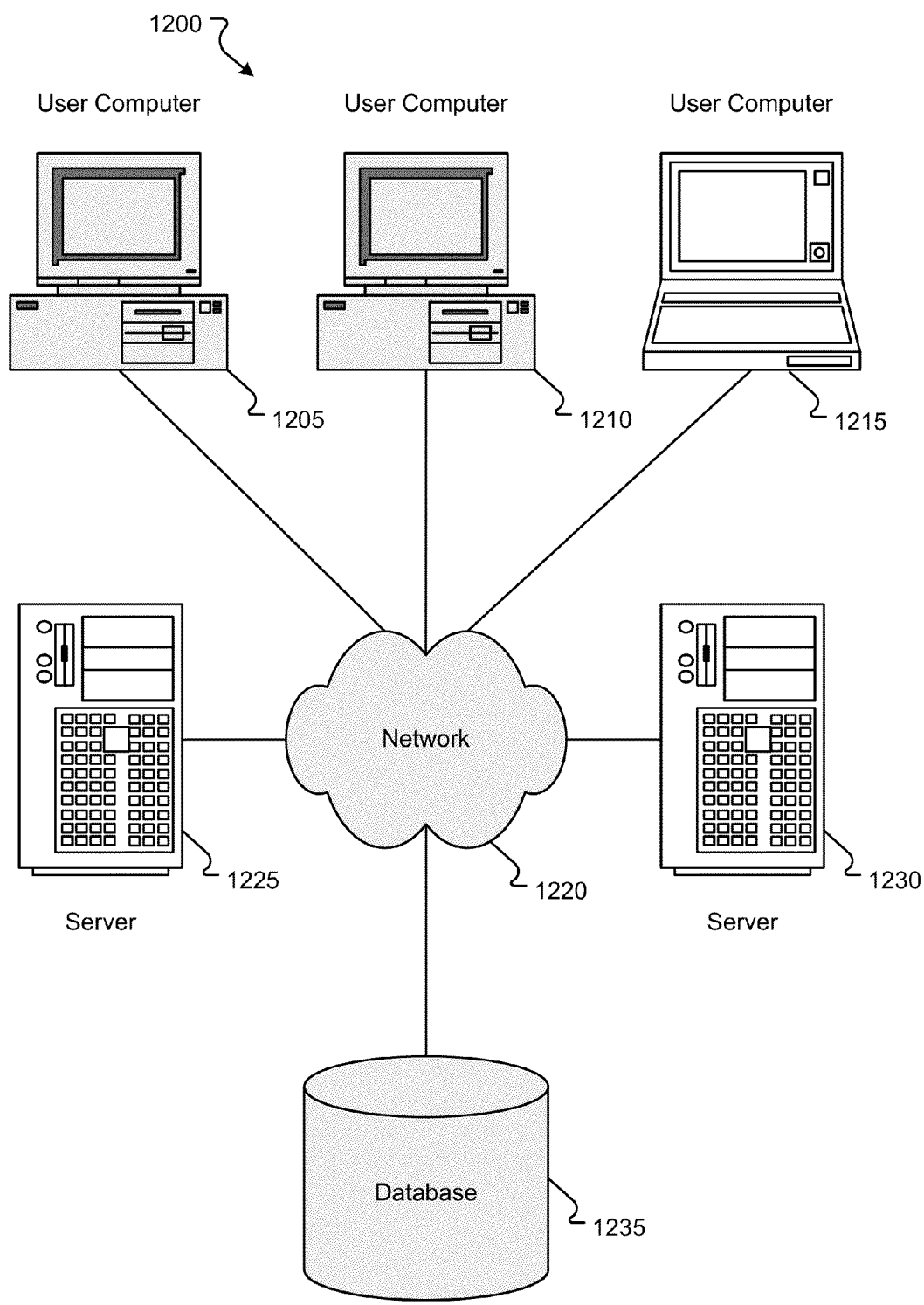
FIG. 12 is a block diagram of an embodiment of a networked computing system operable to function in one or more embodiments presented herein.

An embodiment of a system 1200 that may execute a database system 100 to manage database data is shown in FIG. 12. The system 1200 includes one or more user computers 1205, 1210, and 1215. The user computers 1205, 1210, and 1215 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially available UNIX™ or UNIX-like operating systems. These user computers 1205, 1210, 1215 may also have any of a variety of applications, including, for example, database client and/or server applications, and web browser applications. Alternatively, the user computers 1205, 1210, and 1215 may be any other electronic device, such as a thin-client computer, Internet-enabled mobile telephone, and/or personal digital assistant, capable of communicating via a network (e.g., the network 1220 described below) and/or displaying and navigating web pages or other types of electronic documents. Although the exemplary system 1200 is shown with three user computers, any number of user computers may be supported. The user computers 1205, 1210, and 1215 may form the database users 114 and/or 116.

System 1200 further includes a network 1220. The network 1220 may be any type of network, familiar to those skilled in the art, that can support data communications using any of a variety of commercially available protocols, including without limitation TCP/IP, SNA, IPX, AppleTalk, and the like. Merely by way of example, the network 1220 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks. The network 1220 can form the network 118.

The system may also include one or more server computers 1225, 1230. One server may be a web server 1225, which may be used to process requests for web pages or other electronic documents from user computers 1205, 1210, and 1220. The web server can be running an operating system including any of those discussed above, as well as any commercially available server operating systems. The web server 1225 can also run a variety of server applications, including HTTP servers, FTP servers, CGI servers, database servers, Java servers, and the like. In some instances, the web server 1225 may publish operations available operations as one or more web services.

The system 1200 may also include one or more file and or/application servers 1230, which can, in addition to an operating system, include one or more applications accessible by a client running on one or more of the user computers 1205, 1210, 1215. The server(s) 1230 may be one or more general purpose computers capable of executing programs or scripts in response to the user computers 1205, 1210 and 1215. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 1230 may also include database servers such as database server 102, including without limitation those commercially available from Oracle, Microsoft, Sybase™, IBM™ and the like, which can process requests from database clients running on a user computer 1205.

In some embodiments, an application server 1230 may create web pages dynamically for displaying the database system. The web pages created by the web application server 1230 may be forwarded to a user computer 1205 via a web server 1225. Similarly, the web server 1225 may be able to receive web page requests, web services invocations, and/or input data from a user computer 1205 and can forward the web page requests and/or input data to the web application server 1230.

In further embodiments, the server 1230 may function as a file server. Although for ease of description, FIG. 1 illustrates a separate web server 1225 and file/application server 1230, those skilled in the art will recognize that the functions described with respect to servers 1225, 1230 may be performed by a single server and/or a plurality of specialized servers, depending on implementation-specific needs and parameters.

The system 1200 may also include a database 1235, such as database 106. The database 1235 may reside in a variety of locations. By way of example, database 1235 may reside on a storage medium local to (and/or resident in) one or more of the computers 1205, 1210, 1215, 1225, 1230. Alternatively, it may be remote from any or all of the computers 1205, 1210, 1215, 1225, 1230, and in communication (e.g., via the network 1220) with one or more of these. In a particular set of embodiments, the database 1235 may reside in a storage-area network ("SAN") familiar to those skilled in the art. Similarly, any necessary files for performing the functions attributed to the computers 1205, 1210, 1215, 1225, 1230 may be stored locally on the respective computer and/or remotely, as appropriate. In one set of embodiments, the database 1235 may be a relational database, such as Oracle 10i™, that is adapted to store, update, and retrieve data in response to SQL-formatted commands.

Figure 13:
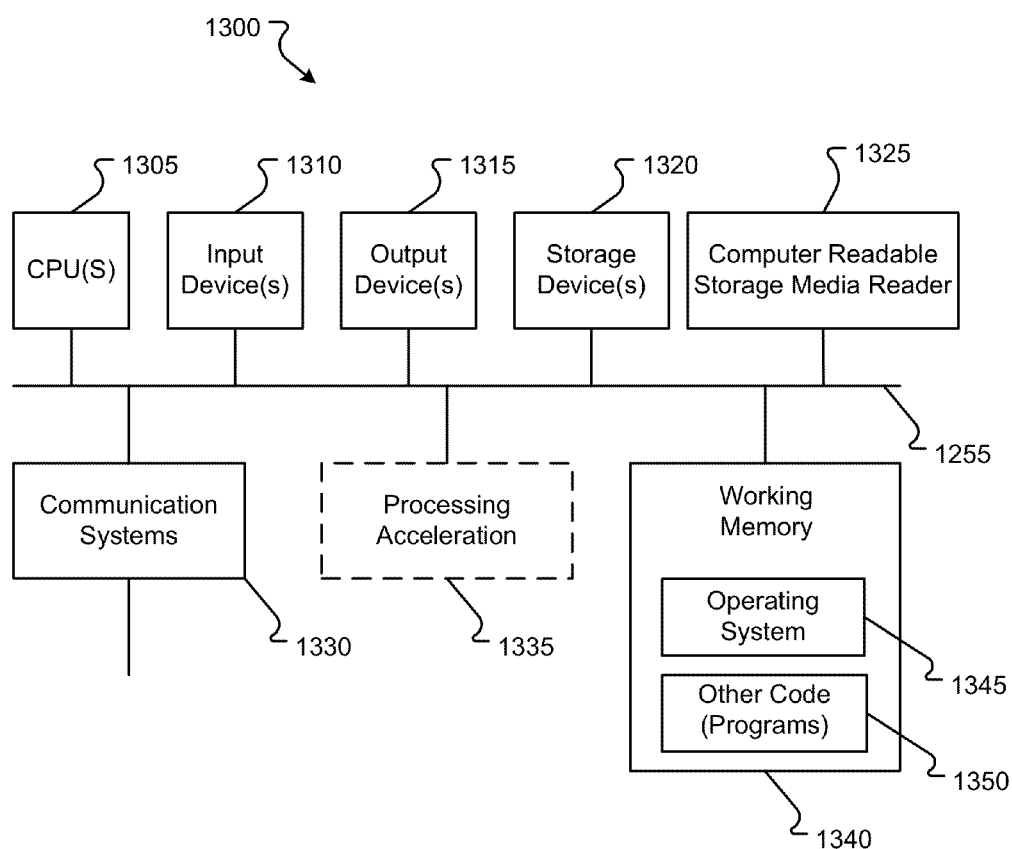
FIG. 13 is a block diagram of an embodiment of a computer system operable to function as one or more embodiments presented herein.

An embodiment of a computer system 1200 upon which a database user 114 or 116 and/or database server 102 may be deployed or executed is shown in FIG. 13. The computer system 1300 is shown comprising hardware elements that may be electrically coupled via a bus 1355. The hardware elements may include one or more central processing units (CPUs) 1305; one or more input devices 1310 (e.g., a mouse, a keyboard, etc.); and one or more output devices 1315 (e.g., a display device, a printer, etc.). The computer system 1300 may also include one or more storage devices 1320. By way of example, storage device(s) 1320 may be disk drives, optical storage devices, solid-state storage device such as a random access memory ("RAM") and/or a read-only memory ("ROM"), which can be programmable, flash-updateable and/or the like.

The computer system 1300 may additionally include a computer-readable storage media reader 1325; a communications system 1330 (e.g., a modem, a network card (wireless or wired), an infra-red communication device, etc.); and working memory 1340, which may include RAM and ROM devices as described above. In some embodiments, the computer system 1300 may also include a processing acceleration unit 1335, which can include a DSP, a special-purpose processor and/or the like.

The computer-readable storage media reader 1325 can further be connected to a computer-readable storage medium, together (and, optionally, in combination with storage device(s) 1320) comprehensively representing remote, local, fixed, and/or removable storage devices plus storage media for temporarily and/or more permanently containing computer-readable information. The communications system 1330 may permit data to be exchanged with the network 1320 and/or any other computer described above with respect to the system 1300.

The computer system 1300 may also comprise software elements, shown as being currently located within a working memory 1340, including an operating system 1345 and/or other code 1350, such as program code implementing a posting component 204, synchronization component 216, and/or the ERP/EPM application 214. It should be appreciated that alternate embodiments of a computer system 1300 may have numerous variations different from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The embodiments presented herein include several alternatives. For example, new data added to general ledger 206 or the multidimensional database 208 may be entered into either the general ledger 206 or the multidimensional database 208. However, when received by the database server 200, the database server 200 may, substantially simultaneously, write the new data to both the general ledger 206 and the multidimensional database 208. In an alternative, the data may be written to only one of the general ledger 206 or the multidimensional database 208 and then synchronized automatically at a later time. Thus, the data can be input easily by the user and automatically copied between the general ledger 206 or the multidimensional database 208 without user intervention.

Further, the mapping between the general ledger 206 and the multidimensional database 208 can be accomplished in various ways. There may be no definitional file 210 or 212 needed in some embodiments. For example, requests for changes to or postings of data to the general ledger 206 or the multidimensional database 208 can include all required metadata to determine the mapping of the data into both the general ledger 206 and the multidimensional database 208. Alternatively, there may be only one definitional file 210 or 212 having all mappings between the general ledger 206 and the multidimensional database 208. Still further, the general ledger 206 or the multidimensional database 208 or both the general ledger 206 and the multidimensional database 208 can include metadata, stored with the general ledger 206 or the multidimensional database 208 and containing the mappings, without a separate definitional file.

The advantages of the embodiments presented herein are numerous. The integration of the general ledger 206 or the multidimensional database 208 eliminates the need for the database user to employ to database systems that provide different functionality. For example, the database user does not need a general ledger for easy data input and a separate multidimensional database for easy query and data manipulation. Rather, the database user, with the embodiments herein, is presented the functionality of both the general ledger 206 and the multidimensional database 208 in a common and simple interface. The ERP/EPM application further provides that common interface; thus, the embodiments also eliminate the need for separate interfaces to the general ledger 206 and the multidimensional database 208.

The embodiments also eliminate the difficult and time-consuming process of manually copying data between the general ledger 206 and the multidimensional database 208. When providing new data, the embodiments can simply write data to both the general ledger 206 and the multidimensional database 208 automatically. Thus, the user enters data once and does not copy the data over to the associated general ledger 206 or the multidimensional database 208. Further, changes to data are automatically synchronized and this automatic synchronization eliminates the need to copy changes between the general ledger 206 and the multidimensional database 208. The automatic synchronization ensures like data between the general ledger 206 and the multidimensional database 208 and reduces false query returns. Embodiments herein also reduce data latency between the general ledger 206 and the multidimensional database 208.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A system, comprising:
   a processor;
   a computer-readable storage medium;
   a metadata repository configured to store structure metadata, wherein the structure metadata defines one or more structures for storing data in both: a) a two-dimensional database, and b) a multidimensional database having more than two dimensions;
   a synchronization component configured to (1) determine that new data has been posted into a first cell in the multidimensional database, (2) determine, based on the structure metadata, a second cell that is mapped to the first cell, and (3) copy the new data from the first cell in the multidimensional database to the second cell in the two-dimensional database;

structure analysis logic configured to determine that a particular structure of the one or more structures is not implemented in the multidimensional database;

structure generation logic configured to generate the particular structure in the multidimensional database based at least in part on the structure metadata and in response to a determination by the structure analysis logic that the particular structure is not implemented in the multidimensional database; and request receiving logic configured to receive a first request to store first data in the multidimensional database, wherein the first request requires that the particular structure be implemented in the multidimensional database;

wherein the structure analysis logic is further configured to, in response to receiving the first request to store data in the multidimensional database, determine whether or not the particular structure is implemented in the multidimensional database;

wherein the request receiving logic is further configured to receive a second request to store second data in the multidimensional database, wherein the second request requires that the particular structure be implemented in the multidimensional database;

wherein the storage logic is further configured to store the second data in a cell of the two-dimensional database in response to the second request to store the second data in the multidimensional database;

wherein the storage logic is further configured to store, in response to determining that the particular structure is implemented in the multidimensional database, the second data in a cell of the particular structure in the multidimensional database that the structure metadata maps to the cell of the two-dimensional database; and wherein the structure metadata includes a record that contains at least:
   a field that identifies the cell of the two-dimensional database and
   a plurality of fields that identify indices of separate dimensions, of the multidimensional database, at the intersection of which the cell of the multidimensional database is located.

2. The system of claim 1, further comprising:
storage logic configured to store the first data in the particular structure in the multidimensional database, in a cell of the particular structure that the structure metadata maps to a cell of the two-dimensional database, after generating the particular structure in the multidimensional database.

3. The system of claim 1, wherein the structure analysis logic is further configured to execute a structural integrity operation according to a schedule, wherein the structural integrity operation performs a comparison between the multidimensional database and the structure metadata.

4. The system of claim 3, wherein the structural integrity operation further performs a comparison between the two-dimensional database and the metadata structure, wherein the structure generation logic is further configured to generate at least one structure in a particular database that is either the two-dimensional database or the multidimensional database based at least in part on the structure metadata in response to determining that the at least one structure has not been implemented in the particular database.

5. A method, comprising:
maintaining a metadata repository that stores structure metadata, wherein the structure metadata defines one or more structures for storing data in both: a) a two-dimensional database, and b) a multidimensional database having more than two dimensions;

determining that new data has been posted into a first cell in the multidimensional database;

determining, based on the structure metadata, a second cell that is mapped to the first cell;

copying the new data from the first cell in the multidimensional database to the second cell in the two-dimensional database;

receiving a first request to store first data in the multidimensional database, wherein the first request requires that a particular structure of the one or more structures be implemented in the multidimensional database;

in response to receiving the first request to store data in the multidimensional database, determining whether or not the particular structure is implemented in the multidimensional database;

determining that the particular structure is not implemented in the multidimensional database;

generating the particular structure in the multidimensional database based at least in part on the structure metadata and in response to said determining that the particular structure is not implemented in the multidimensional database;

receiving a second request to store second data in the multidimensional database, wherein the second request requires that the particular structure be implemented in the multidimensional database;

storing the second data in a cell of the two-dimensional database in response to the second request to store the second data in the multidimensional database; and in response to determining that the particular structure is implemented in the multidimensional database, storing the second data in a cell of the particular structure in the multidimensional database that the structure metadata maps to the cell of the two-dimensional database;

wherein the structure metadata includes a record that contains at least:
   a field that identifies the cell of the two-dimensional database and
   a plurality of fields that identify indices of separate dimensions, of the multidimensional database, at the intersection of which the cell of the multidimensional database is located;

wherein the method is performed by one or more computing devices.

6. The method of claim 5, further comprising:
after generating the particular structure in the multidimensional database, storing the first data in the particular structure in the multidimensional database in a cell of the particular structure that the structure metadata maps to a cell of the two-dimensional database.

7. The method of claim 5, further comprising:
executing a structural integrity operation according to a schedule, wherein the structural integrity operation performs a comparison between the multidimensional database and the structure metadata;

detecting that a change has been made to a structure of a table in the two-dimensional database; and in response to detecting that the change has been made to the structure of the table in the two-dimensional database, modifying the structure metadata to reflect the change that has been made to the structure of the table;

wherein the structural integrity operation modifies a structure of the multidimensional database based on the modification to the structure metadata performed in response to the change that has been made to the structure of the table.

8. The method of claim 7, wherein the structural integrity operation further performs a comparison between the two-dimensional database and the metadata structure, wherein the method further comprises generating at least one structure in a particular database that is either the two-dimensional database or the multidimensional database based at least in part on the structure metadata in response to determining that the at least one structure has not been implemented in the particular database.

9. A computer-readable non-transitory storage medium storing a plurality of instructions executable by one or more processors, the plurality of instructions comprising:

maintaining a metadata repository that stores structure metadata, wherein the structure metadata defines one or more structures for storing data in both: a) a two-dimensional database, and b) a multidimensional database having more than two dimensions;

determining that new data has been posted into a first cell in the multidimensional database;

determining, based on the structure metadata, a second cell that is mapped to the first cell;

copying the new data from the first cell in the multidimensional database to the second cell in the two-dimensional database;

receiving a first request to store first data in the multidimensional database, wherein the first request requires that a particular structure of the one or more structures be implemented in the multidimensional database;

in response to receiving the first request to store data in the multidimensional database, determining whether or not the particular structure is implemented in the multidimensional database;

determining that the particular structure is not implemented in the multidimensional database;

generating the particular structure in the multidimensional database based at least in part on the structure metadata and in response to said determining that the particular structure is not implemented in the multidimensional database;

receiving a second request to store second data in the multidimensional database, wherein the second request requires that the particular structure be implemented in the multidimensional database;

storing the second data in a cell of the two-dimensional database in response to the second request to store the second data in the multidimensional database; and in response to determining that the particular structure is implemented in the multidimensional database, storing the second data in a cell of the particular structure in the multidimensional database that the structure metadata maps to the cell of the two-dimensional database;

wherein the structure metadata includes a record that contains at least:

a field that identifies the cell of the two-dimensional database and a plurality of fields that identify indices of separate dimensions, of the multidimensional database, at the intersection of which the cell of the multidimensional database is located.

10. The computer-readable non-transitory storage medium of claim 9, wherein the instructions further include instructions that cause the one or more processors to perform:

after generating the particular structure in the multidimensional database, storing the first data in the particular structure in the multidimensional database in a cell of the particular structure that the structure metadata maps to a cell of the two-dimensional database.

11. The computer-readable non-transitory storage medium of claim 9, wherein the instructions further include instructions that cause the one or more processors to perform:

executing a structural integrity operation according to a schedule, wherein the structural integrity operation performs a comparison between the multidimensional database and the structure metadata;

detecting that a change has been made to a structure of a table in the two-dimensional database; and in response to detecting that the change has been made to the structure of the table in the two-dimensional database, modifying the structure metadata to reflect the change that has been made to the structure of the table;

wherein the structural integrity operation modifies a structure of the multidimensional database based on the modification to the structure metadata performed in response to the change that has been made to the structure of the table.

12. The computer-readable non-transitory storage medium of claim 11, wherein the structural integrity operation further performs a comparison between the two-dimensional database and the metadata structure, wherein the instructions further include instructions for generating at least one structure in a particular database that is either the two-dimensional database or the multidimensional database based at least in part on the structure metadata in response to determining that the at least one structure has not been implemented in the particular database.

* * * * *

UNITED STATES PATENT AND TRADEMARK OFFICE
CERTIFICATE OF CORRECTION

| | | |
|---|---|---|
| PATENT NO. | : 8,959,050 B2 | Page 1 of 1 |
| APPLICATION NO. | : 13/464899 | |
| DATED | : February 17, 2015 | |
| INVENTOR(S) | : Ng et al. | |

It is certified that error appears in the above-identified patent and that said Letters Patent is hereby corrected as shown below:

In the drawings,

On sheet 8 of 16, in FIG. 8, under reference numeral 808, line 1, delete "Synchornize" and insert -- Synchronize --, therefor.

In the specification,

In column 1, line 13, after "SYSTEM." delete "the" and insert -- The --, therefor.

In column 8, line 26, delete "embodiment." and insert -- embodiment, --, therefor.

In column 8, line 34, delete "milti-" and insert -- multi- --, therefor.

In column 8, line 38, after "functions" delete "un" and insert -- in --, therefor.

Signed and Sealed this
Seventeenth Day of November, 2015

Michelle K. Lee
*Director of the United States Patent and Trademark Office*